United States Patent
Hwang et al.

(10) Patent No.: US 11,456,837 B2
(45) Date of Patent: Sep. 27, 2022

(54) METHOD AND APPARATUS FOR SCHEDULING PLURALITY OF RESOURCES IN NR V2X

(71) Applicant: LG Electronics Inc., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/525,234

(22) Filed: Nov. 12, 2021

(65) Prior Publication Data

US 2022/0077991 A1  Mar. 10, 2022

Related U.S. Application Data

(63) Continuation of application No. PCT/KR2020/006352, filed on May 14, 2020.
(Continued)

(30) Foreign Application Priority Data

Jan. 22, 2020 (KR) .................. 10-2020-0008901

(51) Int. Cl.
 *H04W 4/40* (2018.01)
 *H04W 72/12* (2009.01)
 *H04L 5/00* (2006.01)

(52) U.S. Cl.
 CPC ....... *H04L 5/0053* (2013.01); *H04W 72/1263* (2013.01); *H04W 72/1278* (2013.01)

(58) Field of Classification Search
 CPC ............ H04L 5/0053; H04W 72/1263; H04W 72/1278; H04W 4/40; H04W 72/18
 See application file for complete search history.

(56) References Cited

U.S. PATENT DOCUMENTS

2018/0098322 A1*  4/2018  Yoon ................ H04W 72/0446
2019/0387377 A1* 12/2019  Zhang ............... H04W 52/383
(Continued)

FOREIGN PATENT DOCUMENTS

| CN | 111867092 | * | 4/2019 | ............ H04W 72/04 |
| JP | WO 2020144825 | * | 1/2019 | ............ H04W 52/14 |

(Continued)

OTHER PUBLICATIONS

LG Electronics, "Discussion on physical layer structure for NR sidelink," Rl-1907012, Presented at 3GPP TSG RAN WG1 #97, Reno, USA, May 13-17, 2019, 25 pages.
(Continued)

*Primary Examiner* — Diane L Lo
*Assistant Examiner* — Abusayeed M Haque
(74) *Attorney, Agent, or Firm* — Fish & Richardson P.C.

(57) ABSTRACT

A method for performing wireless communication by a first device, and an apparatus supporting same. The method includes: determining a first PSSCH resource, a second PSSCH resource, and a third PSSCH resource; and transmitting, to a second device, Sidelink Control Information (SCI) including information related to frequency domains of the second PSSCH resource and the third PSSCH resource on a first PSCCH resource related to the first PSSCH resource. Here, the information related to the frequency domains is obtained on the basis of the number of subchannels included in a resource pool, an index of a starting subchannel of the second PSSCH resource, an index of a starting subchannel of the third PSSCH resource, the number of subchannels included in the second PSSCH resource, and the number of subchannels included in the third PSSCH resource, and the information related to the frequency domains may be a zero or positive integer.

17 Claims, 23 Drawing Sheets

Related U.S. Application Data

(60) Provisional application No. 62/847,895, filed on May 14, 2019, provisional application No. 62/916,210, filed on Oct. 16, 2019, provisional application No. 62/938,273, filed on Nov. 20, 2019, provisional application No. 62/977,097, filed on Feb. 14, 2020.

(56) References Cited

U.S. PATENT DOCUMENTS

| | | | |
|---|---|---|---|
| 2020/0266936 A1* | 8/2020 | Wang | H04W 72/042 |
| 2021/0266110 A1* | 8/2021 | Wang | H04L 1/1896 |
| 2022/0007378 A1* | 1/2022 | Basu Mallick | H04W 76/14 |
| 2022/0021558 A1* | 1/2022 | Chen | H04W 24/10 |

FOREIGN PATENT DOCUMENTS

| | | | | |
|---|---|---|---|---|
| JP | WO-2020144825 | * | 1/2019 | H04W 52/14 |
| KR | 1020190087629 | * | 1/2018 | H04W 28/04 |
| KR | 20190027654 | | 3/2019 | |
| WO | WO2018004322 | | 1/2018 | |
| WO | WO2019195505 | * | 4/2019 | H04W 52/24 |

OTHER PUBLICATIONS

Office Action in Korean Appln. No. 10-2021-7036661, dated Dec. 28, 2021, 8 pages (with English translation).

ZTE & Sanechips, "Resource pool sharing between mode 3 and mode 4," R1-1801475, Presented at 3GPP TSG RAN WG1 Meeting #92, Athens, Greece, Feb. 26-Mar. 2, 2018, 7 pages.

Nokia, Nokia Shanghai Bell, "Discussion of Resource Allocation for Sidelink—Mode 2," R1-1905334, Presented at 3GPP TSG RAN WG1 Meeting #96bis, Xi'an, China, Apr. 8-Apr. 12, 2019, 10 pages.

Samsung, "Feature lead summary#3 for 7.2.4.1 Physical layer structure for sidelink," Draft R1-190xxxx, Presented at 3GPP TSG RAN WG1 #96bis Meeting, Xi'an, China, Apr. 8-12, 2019, 27 pages.

Xiaomi Communications, "On Mode 2 resource allocation of V2x communications," R1-1905413, Presented at 3GPP TSG RAN WG1 #96bis, Xi'an, China, Apr. 8-12, 2019, 4 pages.

3GPP TS 36.213 v14.0.0 (Sep. 2016), "UE procedures related to Sidelink," 3rd Generation Partnership Project (3GPP), 3rd Generation Partnership Project; Technical Specification Group Radio Access Network; Evolved Universal Terrestrial Radio Access (E-UTRA); Physical layer procedures (Release 14), Sep. 2016, 22 pages.

Apple, "Resource Allocation for Mode 2," 3GPP TSG RAN WG1 #99, R1-1912812, Reno, USA, Nov. 18-22, 2019, 9 pages.

Extended European Search Report in European Application No. 20805846.1, dated Jul. 18, 2022, 13 pages.

Huawei et al., "Sidelink physical layer structure for NR V2X," 3GPP TSG RAN WG1 Meeting #97, R1-1906007, Reno, USA, May 13-17, 2019, 18 pages.

LG Electronics, "Discussion on resource allocation for Mode 2," 3GPP TSG RAN WG1 Meeting #100, R1-2000783, e-Meeting, Feb. 24-Mar. 6, 2020, 17 pages.

Notice of Allowance in Korean Application No. 10-2021-7036661, dated May 18, 2022, 4 pages (with English translation).

ZTE et al., "NR sidelink physical layer structure," 3GPP TSG RAN WG1 #96bis, R1-1904814, Xi'an, China, Apr. 8-12, 2019, 9 pages.

* cited by examiner

FIG. 4
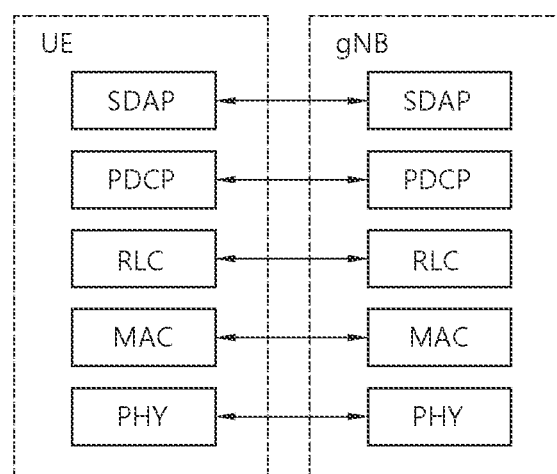
(a)
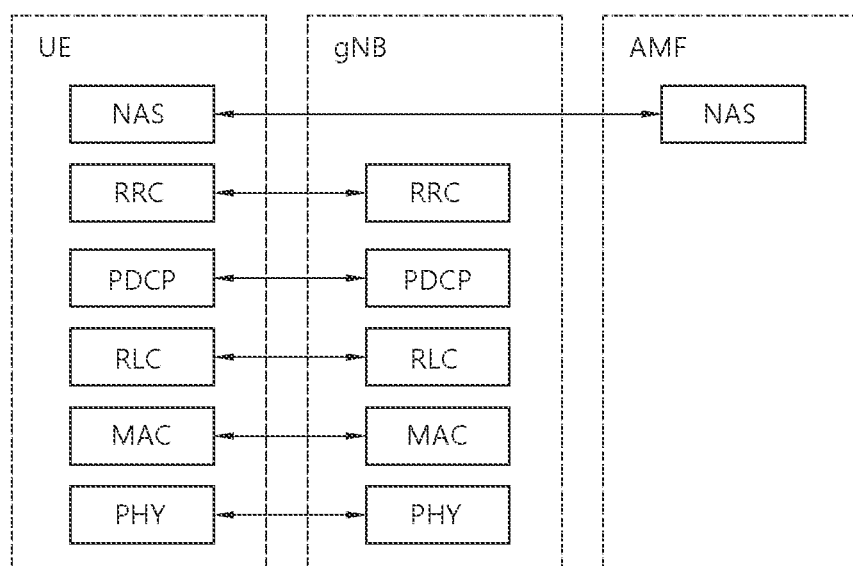
(b)

FIG. 8
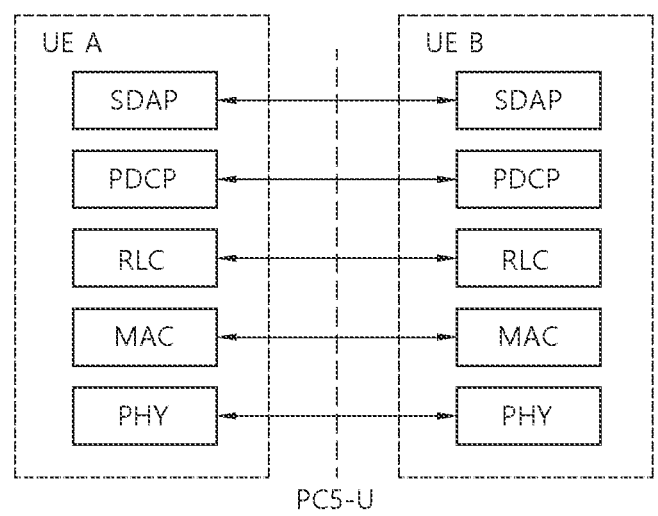
(a)
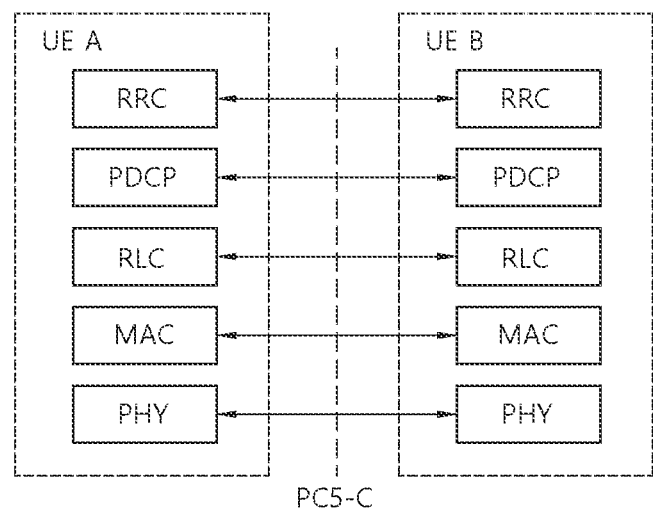
(b)

FIG. 14

| transmit sidelink control information including information related to resource(s) for transmission of sidelink data channel(s) of transmitting UE to receiving UE | ~ S1410 |

# METHOD AND APPARATUS FOR SCHEDULING PLURALITY OF RESOURCES IN NR V2X

CROSS-REFERENCE TO RELATED APPLICATIONS

Pursuant to 35 U.S.C. § 119(e), this application is a continuation of International Application PCT/KR2020/006352, with an international filing date of May 14, 2020, which claims the benefit of U.S. Provisional Patent Application No. 62/847,895, filed on May 14, 2019, U.S. Provisional Patent Application No. 62/916,210, filed on Oct. 16, 2019, U.S. Provisional Patent Application No. 62/938,273, filed on Nov. 20, 2019, Korean Patent Application No. 10-2020-0008901, filed on Jan. 22, 2020, and U.S. Provisional Patent Application No. 62/977,097, filed on Feb. 14, 2020, the contents of which are hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, if a SCI always indicates/represents only future PSSCH resource(s) based on the time when a UE receives the SCI, the UE may not be able to efficiently use information related to PSSCH resource(s) indicated by the past SCI in sensing operation if the UE fails to receive or decode the past SCI.

Technical Solutions

In one embodiment, a method for performing, by a first device, wireless communication is provided. The method may comprise: determining a first physical sidelink shared channel (PSSCH) resource, a second PSSCH resource and a third PSSCH resource; and transmitting, to a second device, a sidelink control information (SCI) including information related to frequency domains of the second PSSCH resource and the third PSSCH resource, based on a first physical sidelink control channel (PSCCH) resource related to the first PSSCH resource, wherein the information related to frequency domains is obtained based on a number of subchannels included in a resource pool, an index of a starting subchannel of the second PSSCH resource, an index of a starting subchannel of the third PSSCH resource, a number of subchannels included in the second PSSCH resource, and a number of subchannels included in the third PSSCH resource, and wherein the information related to frequency domains is a zero or a positive integer.

In one embodiment, a first device configured to perform wireless communication is provided. The first device may comprise: one or more memories storing instructions; one or more transceivers; and one or more processors connected to the one or more memories and the one or more transceivers. For example, the one or more processors may execute the instructions to: determine a first physical sidelink shared channel (PSSCH) resource, a second PSSCH resource and a third PSSCH resource; and transmit, to a second device, a sidelink control information (SCI) including information related to frequency domains of the second PSSCH resource and the third PSSCH resource, based on a first physical sidelink control channel (PSCCH) resource related to the first PSSCH resource, wherein the information related to frequency domains is obtained based on a number of subchannels included in a resource pool, an index of a starting subchannel of the second PSSCH resource, an index of a starting subchannel of the third PSSCH resource, a number of subchannels included in the second PSSCH resource, and a number of subchannels included in the third PSSCH resource, and wherein the information related to frequency domains is a zero or a positive integer.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

FIG. 14 shows a method for a transmitting UE to transmit sidelink control information, based on an embodiment of the present disclosure.

DESCRIPTION OF EXEMPLARY EMBODIMENTS

Figure 1:
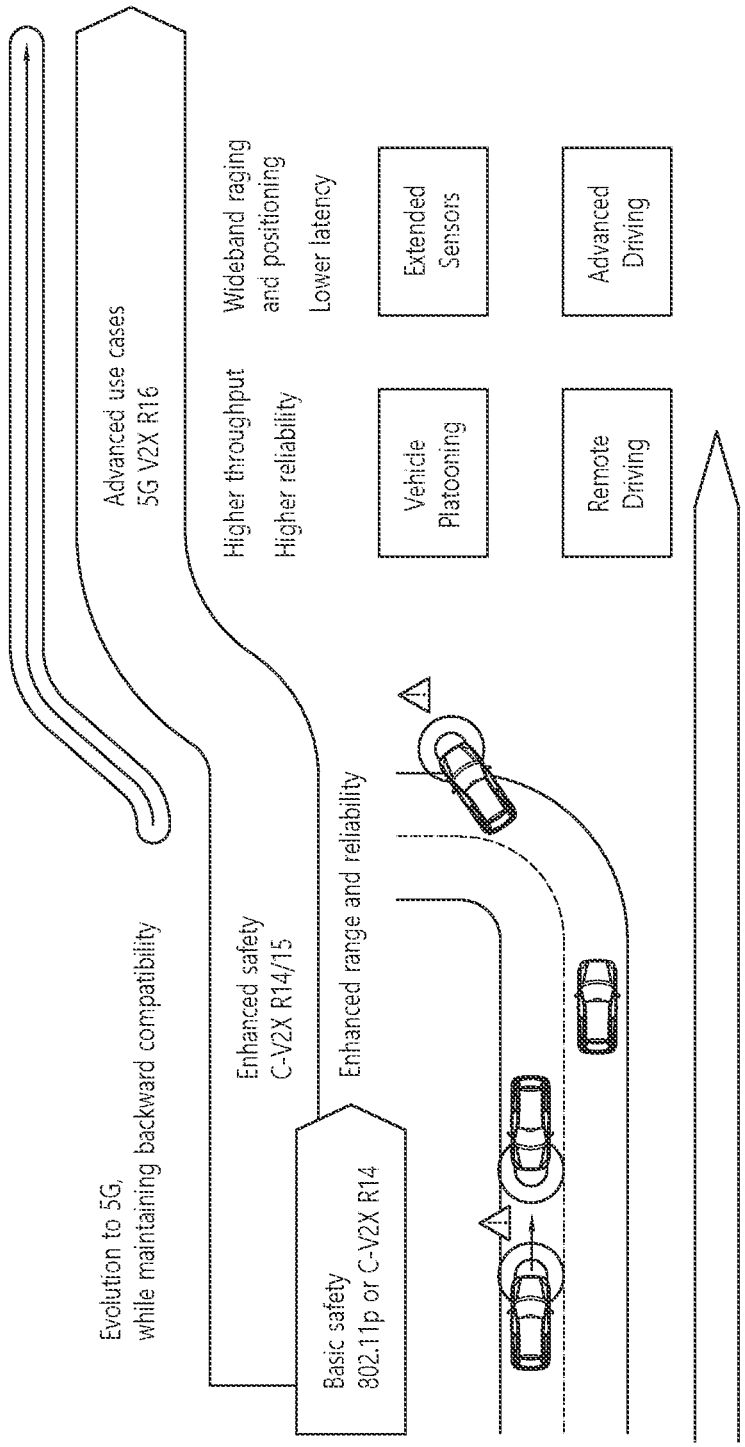
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
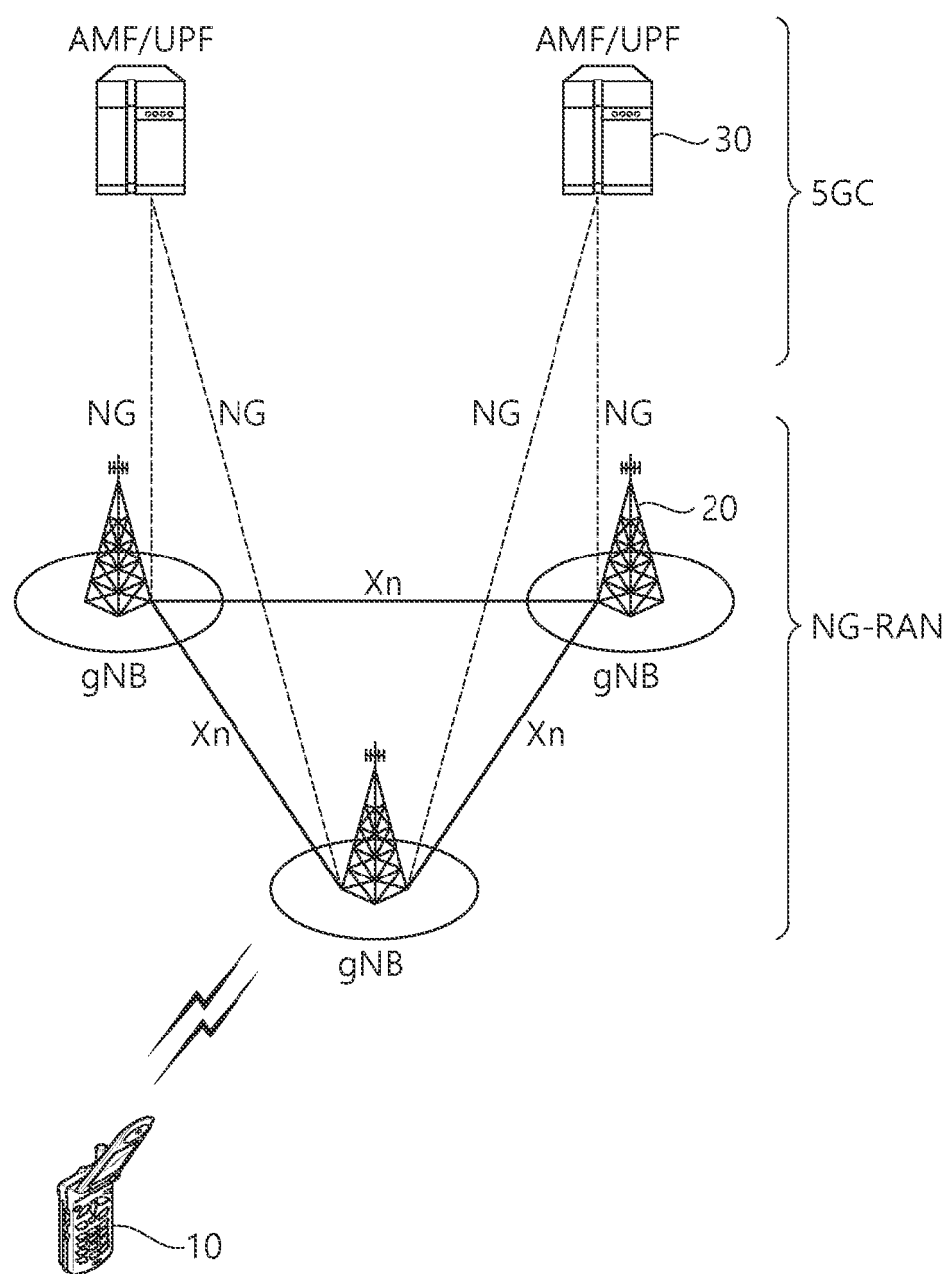
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
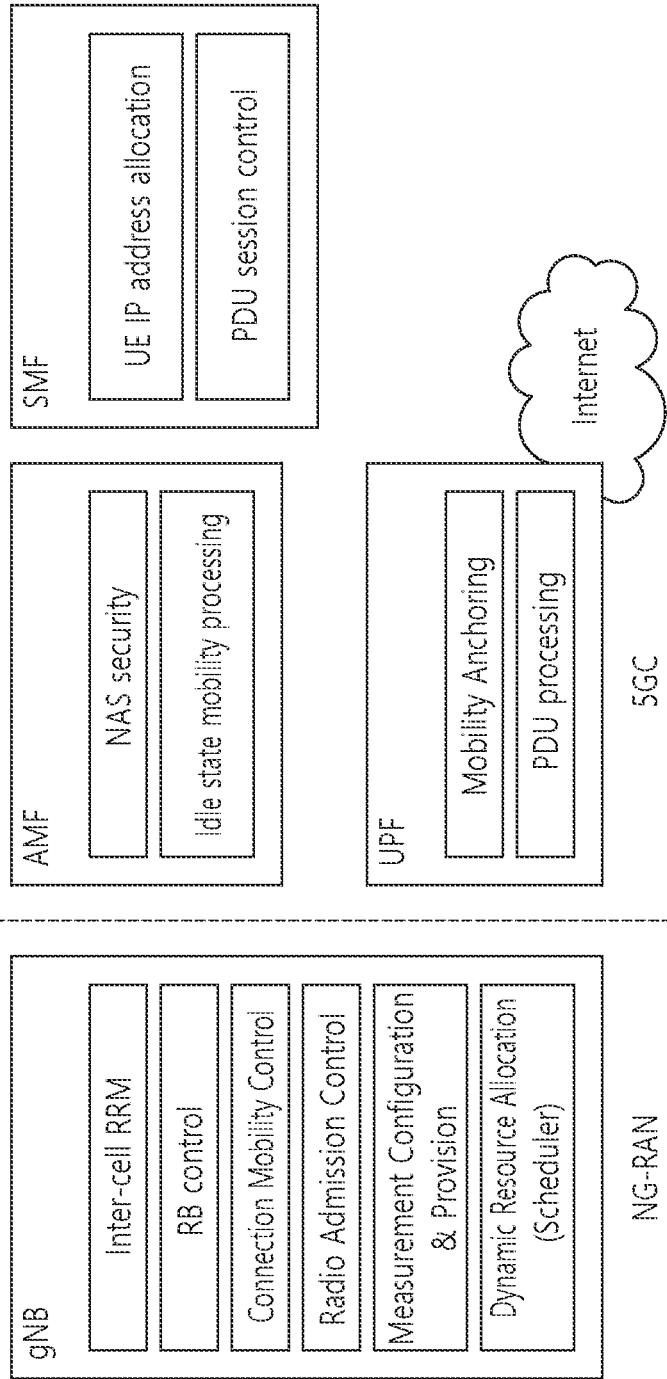
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
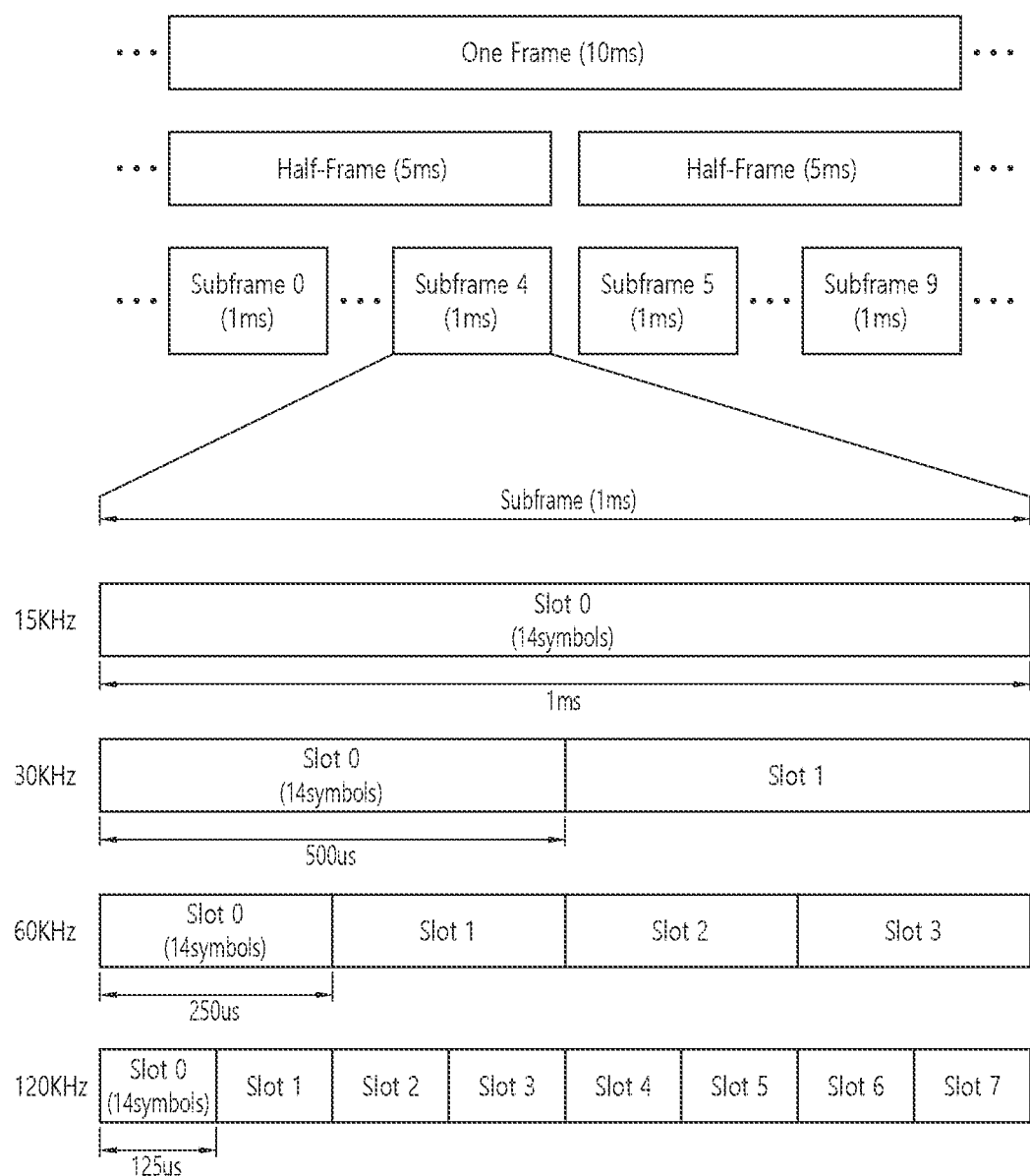
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15*2$^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15*2$^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
| --- | --- | --- |
| FR1 | 410 MHz-7125 MHz | 15, 30, 60 kHz |
| FR2 | 24250 MHz-52600 MHz | 60, 120, 240 kHz |

Figure 6:
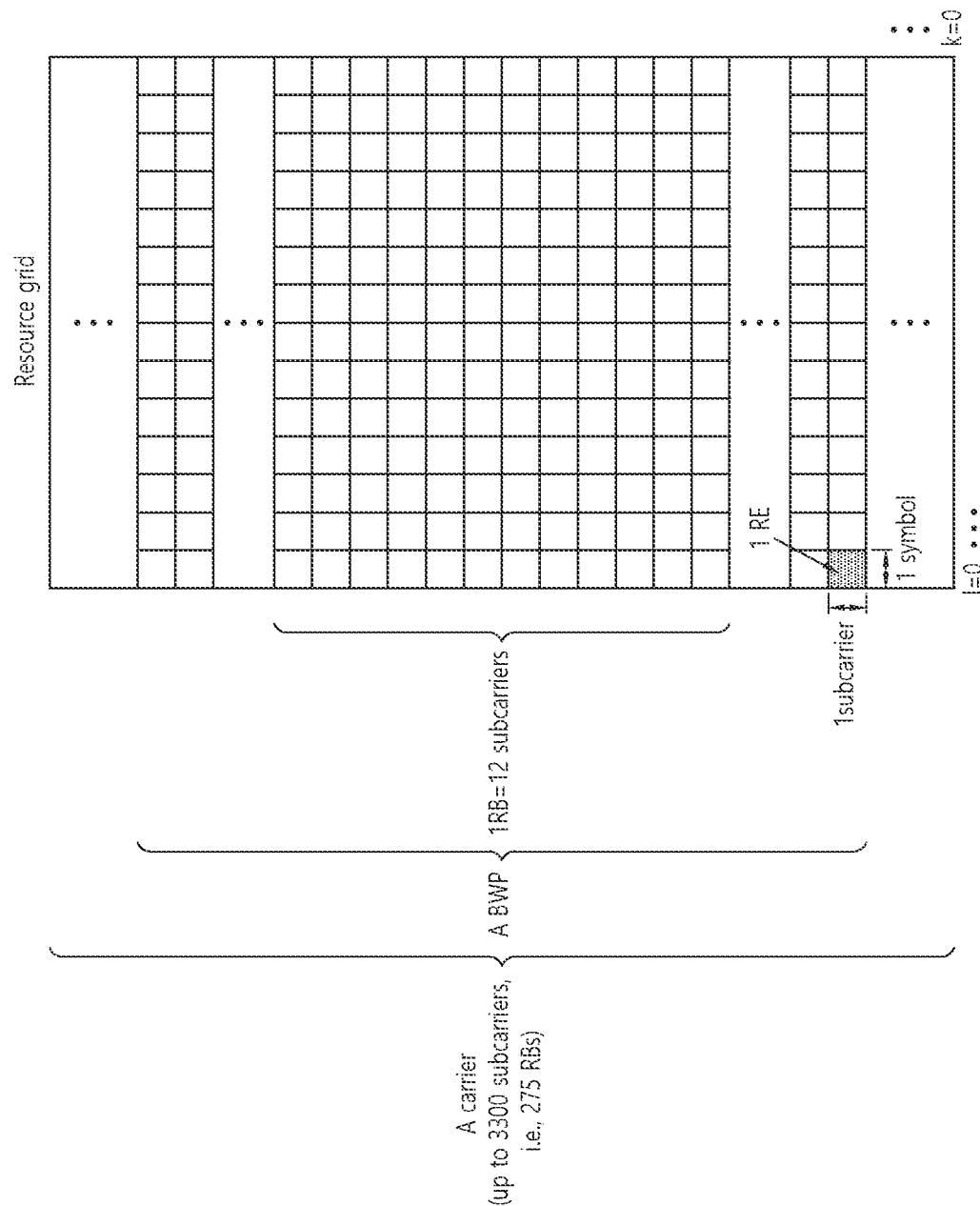
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
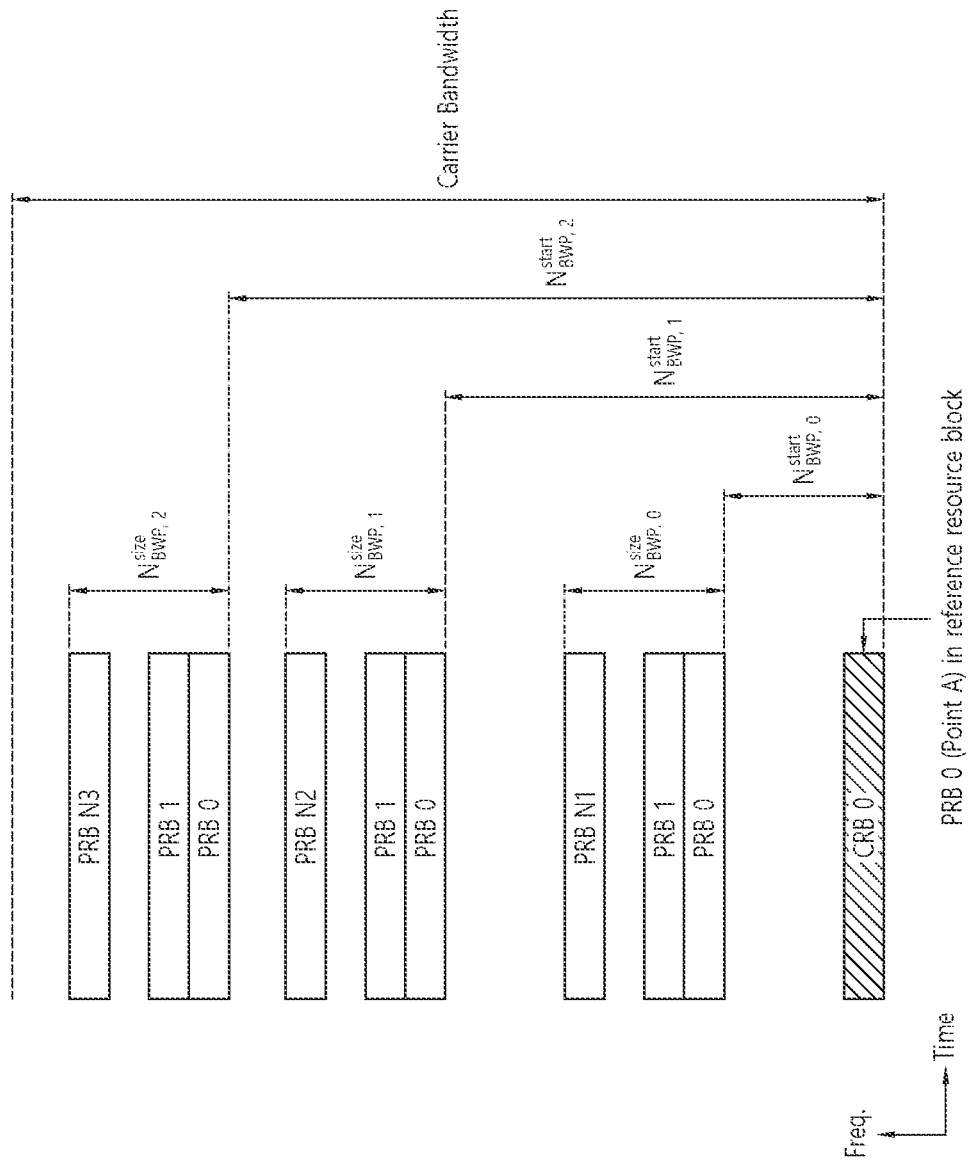
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
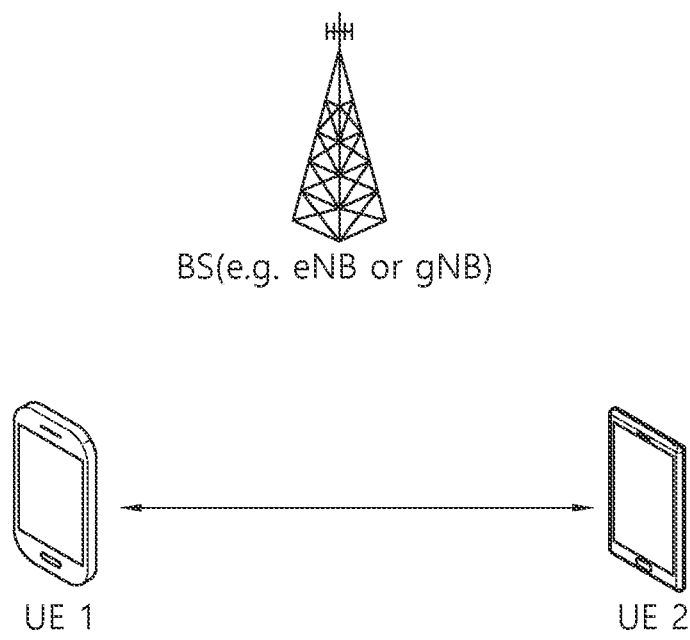
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
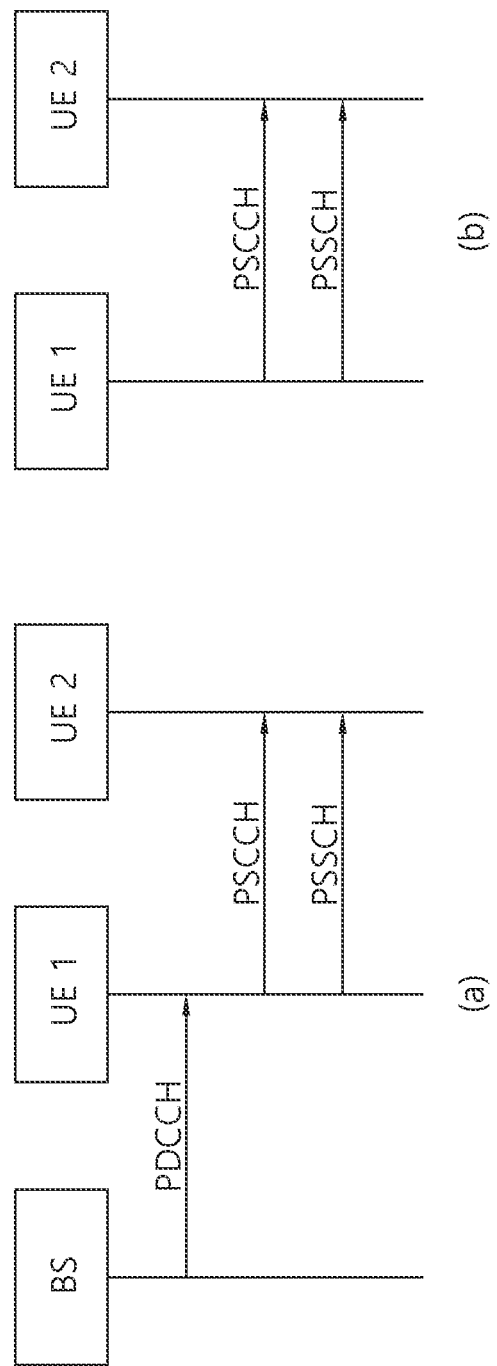
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
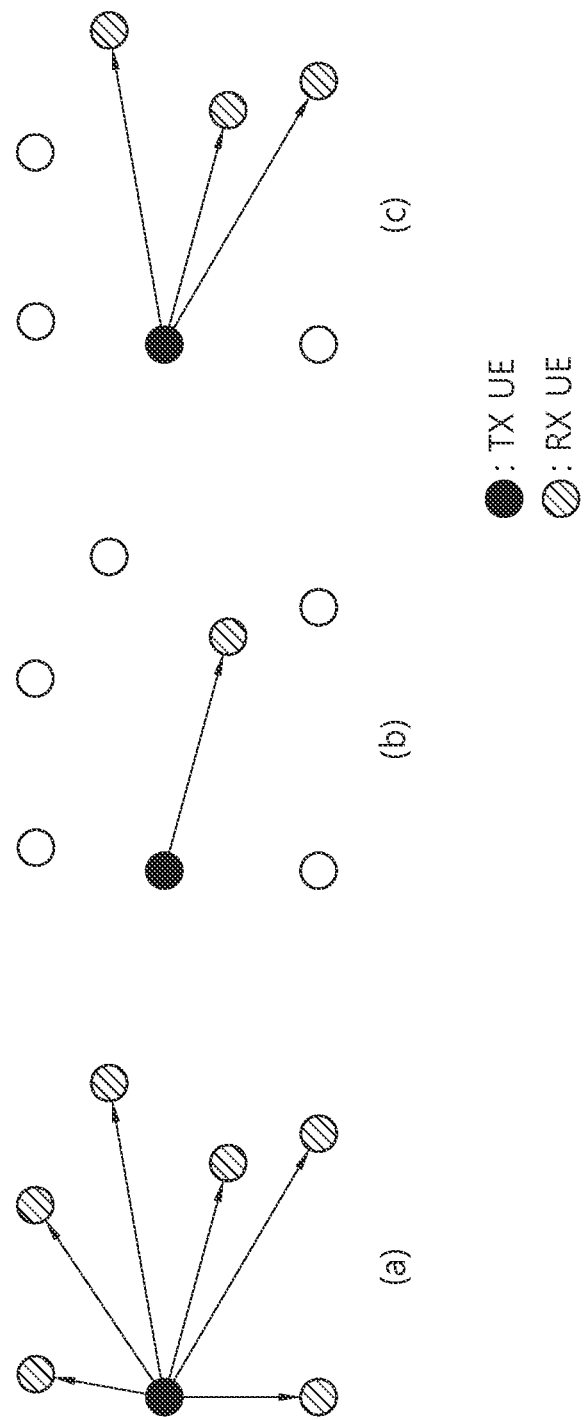
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a sidelink control information (SCI) will be described.

Control information transmitted by a BS to a UE through a PDCCH may be referred to as downlink control information (DCI), whereas control information transmitted by the UE to another UE through a PSCCH may be referred to as SCI. For example, the UE may know in advance a start symbol of the PSCCH and/or the number of symbols of the PSCCH, before decoding the PSCCH. For example, the SCI may include SL scheduling information. For example, the UE may transmit at least one SCI to another UE to schedule the PSSCH. For example, one or more SCI formats may be defined.

For example, a transmitting UE may transmit the SCI to a receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, if SCI configuration fields are divided into two groups in consideration of a (relatively) high SCI payload size, an SCI including a first SCI configuration field group may be referred to as a first SCI or a Pt SCI, and an SCI including a second SCI configuration field group may be referred to as a second SCI or a $2^{nd}$ SCI. For example, the transmitting UE may transmit the first SCI to the receiving UE through the PSCCH. For example, the transmitting UE may transmit the second SCI to the receiving UE on the PSCCH and/or the PSSCH. For example, the second SCI may be transmitted to the receiving UE through an (independent) PSCCH, or may be transmitted in a piggyback manner together with data through the PSSCH. For example, two consecutive SCIs may also be applied to different transmissions (e.g., unicast, broadcast, or groupcast).

For example, the transmitting UE may transmit the entirety or part of information described below to the receiving UE through the SCI. Herein, for example, the transmitting UE may transmit the entirety or part of the information described below to the receiving UE through the first SCI and/or the second SCI.

PSSCH and/or PSCCH related resource allocation information, e.g., the number/positions of time/frequency resources, resource reservation information (e.g., period), and/or SL CSI report request indicator or SL (L1) RSRP (and/or SL (L1) RSRQ and/or SL (L1) RSSI) report request indicator, and/or SL CSI transmission indicator (or SL (L1) RSRP (and/or SL (L1) RSRQ and/or SL (L1) RSSI) information transmission indicator)) (on PSSCH), and/or Modulation Coding Scheme (MCS) information, and/or Transmit power information, and/or L1 destination ID information and/or L1 source ID information, and/or SL HARQ process ID information, and/or New data indicator (NDI) information, and/or Redundancy version (RV) information, and/or (Transmission traffic/packet related) QoS information, e.g., priority information, and/or SL CSI-RS transmission indicator or information on the number of (to-be-transmitted) SL CSI-RS antenna ports Location information of a transmitting UE or location (or distance region) information of a target receiving UE (for which SL HARQ feedback is requested), and/or Reference signal (e.g., DMRS, etc.) related to channel estimation and/or decoding of data to be transmitted through a PSSCH, e.g., information related to a pattern of a (time-frequency) mapping resource of DMRS, rank information, antenna port index information For example, the first SCI may include information related to channel sensing. For example, the receiving UE may decode the second SCI by using a PSSCH DMRS. A polar code used in a PDCCH may be applied to the second SCI. For example, in a resource pool, a payload size of the first SCI may be identical for unicast, groupcast, and broadcast. After decoding the first SCI, the receiving UE does not have to perform blind decoding of the second SCI. For example, the first SCI may include scheduling information of the second SCI.

Meanwhile, in various embodiments of the present disclosure, since the transmitting UE may transmit at least one of the SCI, the first SCI, and/or the second SCI to the receiving UE through the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE through the PSSCH, the PSSCH may be replaced/substituted with the second SCI.

In the present disclosure, the first SCI may be referred to as a SCI format 0_1 or a SCI format 0-1, and the second SCI may be referred to as a SCI format 0_2 or a SCI format 0-2.

Meanwhile, in sidelink communication, for reasons such as resource collision handling, a UE may indicate/represent resources for a plurality of PSSCHs by using one SCI. In the present disclosure, a resource for a PSSCH may mean a resource to which the PSSCH is mapped or a resource related to transmission of the PSSCH, and may be referred to as a PSSCH resource. In this case, a UE which has received a SCI indicating/representing the plurality of PSSCH resources may use the plurality of PSSCH resources indicated/represented by the SCI for sensing operation, and may schedule resource(s) based on the sensing operation. For example, if a UE which has received a SCI indicating/representing the plurality of PSSCH resources determines that the UE is not the target UE for the plurality of PSSCHs based on a destination ID, the UE may use the plurality of PSSCH resources indicated/represented by the SCI for sensing operation, and may schedule resource(s) based on the sensing operation. For example, if a UE which has received a SCI indicating/representing the plurality of PSSCH resources determines that the UE is the target UE for the plurality of PSSCHs based on a destination ID, the UE may receive PSSCH(s) on a plurality of PSSCH resources indicated/represented by the SCI. Specifically, the using for sensing operation may include: performing, by a UE, resource selection by always avoiding PSSCH resource(s) indicated by a SCI, or performing, by a UE which has performed RSRP measurement or energy detection for PSSCH resource(s) indicated by a SCI, resource selection by avoiding resource(s) in which corresponding value is above or below a certain threshold.

Considering periodic traffic, each PSSCH resource indicated/represented by a SCI may be repeated at a period pre-defined in the system, a period configured for a UE from a network, a period pre-configured for a UE from a network, or a period indicated/represented by the SCI. In addition, a SCI including indication for the corresponding PSSCH resource(s) may be transmitted again in slot(s) to which each PSSCH resource indicated/represented by the SCI is mapped. If a UE fails to initially receive a SCI or fails to decode the SCI, the UE may not recognize a plurality of PSSCH resources. Accordingly, the UE may not be able to efficiently use information related to the plurality of PSSCH resources in sensing operation. If SCI(s) corresponding to each PSSCH resource again indicates/represents a plurality of PSSCH resources, the probability of the UE detecting the SCI(s) may increase. Accordingly, the UE can efficiently use information related to the plurality of PSSCH resources in sensing operation.

Meanwhile, if a SCI always indicates/represents only future PSSCH resource(s) based on the time when a UE receives the SCI, the UE may not be able to efficiently use information related to PSSCH resource(s) indicated by the past SCI in sensing operation if the UE fails to receive or decode the past SCI.

Hereinafter, based on an embodiment of the present disclosure, a method for a UE to transmit a SCI and device(s) supporting the same will be described.

Figure 12:
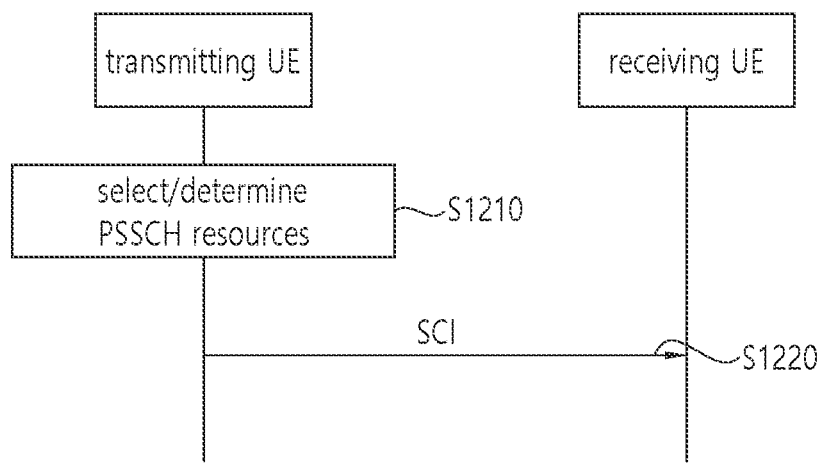
FIG. 12 shows a procedure for a UE to transmit information related to PSSCH resource(s), based on an embodiment of the present disclosure.

FIG. 12 shows a procedure for a UE to transmit information related to PSSCH resource(s), based on an embodiment of the present disclosure. The embodiment of FIG. 12 may be combined with various embodiments of the present disclosure.

Referring to FIG. 12, in step S1210, a transmitting UE may select or determine a plurality of PSSCH resources. For example, the transmitting UE may select or determine a plurality of PSSCH resources by itself based on sensing. For example, the transmitting UE may receive information related to a plurality of PSSCH resources (e.g., DCI) from a base station, and the transmitting UE may select or determine a plurality of PSSCH resources based on the information.

In step S1220, the transmitting UE may transmit a SCI including information related to a plurality of PSSCH resources and a retransmission index to a receiving UE. For example, the transmitting UE may transmit the SCI indicating/representing a plurality of PSSCH resources and the retransmission index to the receiving UE. The number of PSSCH resources indicated/represented by the SCI may be pre-defined in the system, configured by a network for the UE, or pre-configured by the network for the UE. Accordingly, the payload size of the SCI may not change. The retransmission index may indicate or inform the receiving UE which PSSCH resource among a plurality of PSSCH resources is used/allocated/transmitted (i.e., the order of a PSSCH resource among a plurality of PSSCH resources) in a slot in which the SCI is transmitted. In the present disclosure, the retransmission index may be referred to as various terms such as an index or retransmission information. The number of bits of the retransmission index may be obtained by Equation 1.

$$\text{The number of bits of retransmission index} = \text{ceiling}(\log_2 N) \quad \text{[Equation 1]}$$

Herein, N may be the number of a plurality of PSSCH resources. For example, if the number of PSSCH resources indicated/represented by a SCI is 4, the SCI may additionally include a retransmission index of 2 bits. For example, if the number of PSSCH resources indicated/represented by a SCI is 6, the SCI may additionally include a retransmission index of 3 bits.

For example, if the transmitting UE transmits a SCI indicating/representing N PSSCH resources to the receiving UE, the SCI may further include a retransmission index. Herein, N may be an integer greater than 1. The retransmission index may be information informing that a K-th PSSCH resource among N PSSCH resources is allocated/used in a slot in which the SCI is transmitted. Herein, the range of K may be defined by Equation 2.

$$1 < K \leq N \quad \text{[Equation 2]}$$

For example, it is assumed that a SCI indicates/represents 4 PSSCH resources. In this case, the SCI may further include a retransmission index of 2 bits.

CASE A1) If the transmitting UE transmits a SCI including a retransmission index indicating/representing the first PSSCH resource to the receiving UE, the receiving UE may determine/know that the first PSSCH resource among 4 PSSCH resources exists in a slot in which the SCI is transmitted. In addition, the receiving UE may determine/know that the remaining three PSSCH resources exist after one time gap or a plurality of time gaps from the slot in which the SCI is transmitted. For example, one time gap or a plurality of time gaps may be pre-defined in the system, configured by the network for the UE, pre-configured by the network for the UE, and/or indicated/represented by the SCI.

CASE A2) If the transmitting UE transmits a SCI including a retransmission index indicating/representing the second PSSCH resource to the receiving UE, the receiving UE may determine/know that the second PSSCH resource among 4 PSSCH resources exits in a slot in which the SCI is transmitted. In addition, the receiving UE may determine/know that the first PSSCH resource exists before one time gap or a plurality of time gaps from the slot in which the SCI is transmitted. In addition, the receiving UE may determine/know that the third PSSCH resource and the fourth PSSCH resource exist after one time gap or a plurality of time gaps from the slot in which the SCI is transmitted. For example, one time gap or a plurality of time gaps may be pre-defined in the system, configured by the network for the UE, pre-configured by the network for the UE, and/or indicated/represented by the SCI.

CASE A3) If the transmitting UE transmits a SCI including a retransmission index indicating/representing the third PSSCH resource to the receiving UE, the receiving UE may determine/know that the third PSSCH resource among 4 PSSCH resources exists in a slot in which the SCI is transmitted. In addition, the receiving UE may determine/know that the first PSSCH resource and the second PSSCH resource exist before one time gap or a plurality of time gaps from the slot in which the SCI is transmitted. In addition, the receiving UE may determine/know that the fourth PSSCH resource exists after one time gap or a plurality of time gaps from the slot in which the SCI is transmitted. For example, one time gap or a plurality of time gaps may be pre-defined in the system, configured by the network for the UE, pre-configured by the network for the UE, and/or indicated/represented by the SCI.

CASE A4) If the transmitting UE transmits a SCI including a retransmission index indicating/representing the fourth PSSCH resource to the receiving UE, the receiving UE may determine/know that the fourth PSSCH resource among 4 PSSCH resources exists in a slot in which the SCI is transmitted. In addition, the receiving UE may determine/know that the remaining three PSSCH resources exist before one time gap or a plurality of time gaps from the slot in which the SCI is transmitted. For example, one time gap or a plurality of time gaps may be pre-defined in the system, configured by the network for the UE, pre-configured by the network for the UE, and/or indicated/represented by the SCI.

Based on an embodiment of the present disclosure, redundancy version (RV) values applied to a plurality of PSSCH resources may be different. Specifically, an RV pattern (e.g., a set including a plurality of RV values or a set consisting of a plurality of RV values) may be configured or pre-configured for the UE for each resource pool. Additionally/alternatively, an RV pattern may be indicated/represented by a SCI. For example, the transmitting UE may transmit the SCI indicating/representing the RV pattern to the receiving UE. In this case, an RV value used in each PSSCH resource may be one RV value selected from within the RV pattern/set based on the retransmission index, and the UE may transmit and receive each PSSCH based on the RV value related to each PSSCH resource. For example, an RV value used in each PSSCH resource may be one RV value selected based on the order indicated/represented within the RV pattern/set based on the retransmission index, and the UE may transmit and receive each PSSCH based on the RV value related to each PSSCH resource.

Alternatively, if redundancy version (RV) values applied to a plurality of PSSCH resources are different, an RV field may exist in a SCI. In addition, each SCI may indicate/represent an RV value applied to transmission of the corresponding PSSCH. Specifically, information on the order in which a plurality of PSSCH resources are allocated/transmitted may be related to the RV field. In this case, a retransmission index informing which PSSCH resource is used/allocated/transmitted (i.e., the order of a PSSCH resource among a plurality of PSSCH resources) in a slot in which the SCI is transmitted may not exist in the SCI. The receiving UE may determine which PSSCH resource among a plurality of PSSCH resources is used/allocated/transmitted in a slot in which the SCI is transmitted based on the RV value. For example, the RV values 0, 2, 3, and 1 may indicate/represent that a plurality of PSSCH resources indicated/represented by the SCI are the first, the second, the third, and the fourth, respectively.

CASE B1) If the transmitting UE transmits a SCI including RV=0 to the receiving UE, the receiving UE may determine/know that the first PSSCH resource among 4 PSSCH resources exists in a slot in which the SCI is transmitted. In addition, the receiving UE may determine/know that the remaining three PSSCH resources exist after one time gap or a plurality of time gaps from the slot in which the SCI is transmitted. For example, one time gap or a plurality of time gaps may be pre-defined in the system, configured by the network for the UE, pre-configured by the network for the UE, and/or indicated/represented by the SCI.

CASE B2) If the transmitting UE transmits a SCI including RV=2 to the receiving UE, the receiving UE may determine/know that the second PSSCH resource among 4 PSSCH resources exists in a slot in which the SCI is transmitted. In addition, the receiving UE may determine/know that the first PSSCH resource exists before one time gap or a plurality of time gaps from the slot in which the SCI is transmitted. In addition, the receiving UE may determine/know that the third PSSCH resource and the fourth PSSCH resource exist after one time gap or a plurality of time gaps from the slot in which the SCI is transmitted. For example, one time gap or a plurality of time gaps may be pre-defined in the system, configured by the network for the UE, pre-configured by the network for the UE, and/or indicated/represented by the SCI.

CASE B3) If the transmitting UE transmits a SCI including RV=3 to the receiving UE, the receiving UE may determine/know that the third PSSCH resource among 4 PSSCH resources exists in a slot in which the SCI is transmitted. In addition, the receiving UE may determine/know that the first PSSCH resource and the second PSSCH resource exist before one time gap or a plurality of time gaps from the slot in which the SCI is transmitted. In addition, the receiving UE may determine/know that the fourth PSSCH resource exists after one time gap or a plurality of time gaps from the slot in which the SCI is transmitted. For example, one time gap or a plurality of time gaps may be pre-defined in the system, configured by the network for the UE, pre-configured by the network for the UE, and/or indicated/represented by the SCI.

CASE B4) If the transmitting UE transmits a SCI including RV=1 to the receiving UE, the receiving UE may determine/know that the fourth PSSCH resource among 4 PSSCH resources exists in a slot in which the SCI is transmitted. In addition, the receiving UE may determine/know that the remaining three PSSCH resources exist before one time gap or a plurality of time gaps from the slot in which the SCI is transmitted. For example, one time gap or a plurality of time gaps may be pre-defined in the system, configured by the network for the UE, pre-configured by the network for the UE, and/or indicated/represented by the SCI.

For convenience of description, it is assumed that each of the RV values 0, 2, 3, and 1 indicates/represents the first PSSCH resource, the second PSSCH resource, the third PSSCH resource, and the fourth PSSCH resource, respectively, among a plurality of PSSCH resources indicated by the SCI. However, the technical idea of the present disclosure is not limited to the above embodiment, and the order of RV values may be changed.

If the number of PSSCH resources indicated/represented by the SCI exceeds 4, the size of the RV field may also exceed 2. In this case, the RV value may be applied actually by repeating 0, 2, 3, and 1 cyclically. The size of the RV field may be obtained by Equation 3.

The size of RV field=ceiling (log$_2$N)  [Equation 3]

Herein, N may be the number of a plurality of PSSCH resources, and the size of the RV field may be a bit value. For example, if the number of PSSCH resources indicated/represented by a SCI is 8, the size of the RV field may be 3. In this case, the actually applied RV value may be 0, 2, 3, 1, 0, 2, 3, and 1. The RV values may correspond to the first PSSCH resource to the eighth PSSCH resource in order, respectively.

Based on an embodiment of the present disclosure, for example, the UE may perform resource allocation and/or resource reservation less than the number of PSSCH resources that can be indicated/represented by a SCI, based on packet(s) or according to a situation. This is because excessive resource reservation may lower network spectral efficiency. Based on an embodiment of the present disclosure, when the number of PSSCH resources that can be indicated/represented by a SCI is N, the transmitting UE may indicate/represent only K PSSCH resources. Here, K is an integer less than N. If it is assumed that the transmitting UE uses resource indication value (RIV) method-based resource allocation, the receiving UE may ignore the corresponding resource indication or the corresponding resource reservation for a PSSCH resource indicated/represented by an unused state value. Specifically, since an index of a starting RB or a starting sub-channel and/or the number of RBs or the number of sub-channels is expressed as bits in the RIV method, some bit sequence combinations may be in a reserved state. For example, if the transmitting UE transmits a specific value (e.g., all bit values are set to 1) among the unused state values to the receiving UE through a SCI, the receiving UE may ignore information on a PSSCH resource related to the specific value. That is, the receiving UE may not consider the information on the PSSCH resource related to the specific value in subsequent sensing operation.

Alternatively, if a value of time gap(s) for each information on each PSSCH resource is indicated/represented as an unused state or a reserved state, the receiving UE may ignore the corresponding resource indication or the corresponding resource reservation. For example, a reference point of time gap(s) may be a slot corresponding to the first PSSCH resource.

Alternatively, a SCI may indicate/represent the number of PSSCH resources to be reserved among N PSSCH resources through a separate field. If a value of the field is set to K, only the first PSSCH resource to K-th PSSCH resource among N PSSCH resources indicated/represented by the SCI may be used for resource indication or resource reservation.

Meanwhile, in the next-generation system, transmission times and/or frequency domains of a plurality of PSSCH resources may be simultaneously indicated/represented (by a joint indication). For example, a reference point of time gap(s) for each PSSCH resource may be a slot corresponding to the first PSSCH resource, and the UE may perform transmission based on a plurality of PSSCH resources within pre-defined or (pre-)configured scheduling. For example, if the UE indicates/represents up to N PSSCH resources including the first PSSCH resource by using the same SCI within a W slot time period (or a W slot window) from the transmission time of the first PSSCH resource or within the corresponding time period in which the number of slots in which PSSCH(s) can be transmitted within a specific time period is W, and the number of sub-channels in a resource pool is M, the total number of possible combinations of PSSCH resources may be expressed as in Equation 4. In the above, if the UE can transmit PSSCHs in W slots within a specific time period, a location of the W slots may be (pre-)configured.

$$\sum_{n=0}^{N-1} \binom{W}{n} \sum_{m=1}^{M} (M+1-m)^{n+1}$$  [Equation 4]

For example, the first sub-channel included in PSSCH resource(s) initially allocated by the UE may be estimated/determined from a location of a PSCCH resource. In this case, for example, if the UE allocates n additional PSSCH resources in addition to the PSSCH resource initially allocated, the number of combinations of allocated PSSCH resources may be expressed as in Equation 5.

$$\sum_{n=0}^{N-1} \binom{W}{n} \sum_{m=1}^{M} (M+1-m)^{n}$$  [Equation 5]

For example, based on the number of allocated PSSCH resources and/or the starting sub-channel of each PSSCH resource and/or the number of sub-channels allocated for each PSSCH resource, the UE may allocate or determine a value indicating/representing PSSCH resource(s) differently. For convenience of description, the value indicating/representing PSSCH resource(s) may be referred to as a resource indication value (RIV). Therefore, based on the resource indication value allocated or determined differently, the receiving UE can determine/know PSSCH resource(s) allocated by the transmitting UE without ambiguity. For example, the resource indication value may be allocated or determined in an increasing order in the order of the starting sub-channel index of PSSCH resource(s), the number of sub-channels allocated for PSSCH resource(s), and the number of PSSCH resources indicated/represented by a SCI. For example, the resource indication value may be allocated or determined in a decreasing order in the order of the starting sub-channel index of PSSCH resource(s), the number of sub-channels allocated for PSSCH resource(s), and the number of PSSCH resources indicated/represented by a SCI.

For example, if the UE allocates one PSSCH resource, starting with the case where the number of sub-channels allocated for the PSSCH resource is one, as the possible starting sub-channel index increases, the resource indication value may increase. In addition, if the starting sub-channel index of the PSSCH resource reaches the maximum value for the given number of allocated sub-channels, the UE increases the number of allocated sub-channels. Thereafter, as the starting sub-channel index increases, the UE may increase the resource indication value again. In addition, if the starting sub-channel index of the PSSCH resource reaches the maximum value again, the UE may increase the number of PSSCH resources indicated/represented by the SCI. Thereafter, starting with the case where the number of sub-channels allocated for PSSCH resources is one, the UE may allocate or determine the resource indication value in the form of increasing the resource indication value based on the combination of the starting sub-channel index of the first allocated PSSCH resource and the starting sub-channel index of the second allocated PSSCH resource.

For example, if the UE allocates a greater number of PSSCH resources than the above, the above-described method may be extended as follows. Specifically, if the starting sub-channels for n allocated PSSCH resources are S_1, S_2, . . . , and S_n, respectively, the UE may allocate or determine the resource indication value in an increasing order from S_n to S_1. That is, as a value of S_n increases, the UE may increase the resource indication value. In this case, if the value of S_n reaches the maximum value, the UE may return the value of S_n to 0, and then the UE may increase a value of S_(n−1). Thereafter, as the value of S_n increases, the UE may increase the resource indication value repeatedly again. Alternatively, the UE may allocate or determine the resource indication value in an increasing order from S_1 to S_n. That is, as a value of S_1 increases, the UE may increase the resource indication value. In this case, if the value of S_1 reaches the maximum value, the UE may return the value of S_1 to 0, and then the UE may increase a value of S_2. Thereafter, as the value of S_1 increases, the UE may increase the resource indication value repeatedly again.

As another example, a reference point of time gap(s) for each PSSCH resource may be a slot corresponding to a PSSCH resource of the previous time. For example, the first PSSCH resource may be located in a slot in which a SCI for scheduling the first PSSCH resource is transmitted, and thereafter, the reference point of the time gap of the i-th PSSCH resource may be a slot corresponding to the (i−1)-th PSSCH resource. For example, the UE may perform sidelink transmission using the (i−1)-th PSSCH resource, and the UE perform sidelink transmission using the i-th PSSCH resource located after 1, 2, . . . , or P slots from the (i−1)-th PSSCH resource. Alternatively, for example, the UE may perform sidelink transmission using the (i−1)-th PSSCH resource, and the UE perform sidelink transmission using the i-th PSSCH resource located after S_1, S_2, . . . , or S_P slots from the (i−1)-th PSSCH resource. Herein, for example, slot information for S_P may be pre-defined for the UE. For example, slot information for S_P may be configured or pre-configured for the UE. In this case, the number of time gaps may be P. For example, if the UE indicates/represents up to N PSSCH resources including the first PSSCH resource by using the same SCI, and the number of sub-channels in a resource pool is M, the total number of possible combinations of PSSCH resources may be expressed as in Equation 6.

$$\sum_{n=0}^{N-1} P^n \sum_{m=1}^{M} (M+1-m)^{n+1}$$ [Equation 6]

For example, based on the number of allocated PSSCH resources and/or the starting sub-channel of each PSSCH resource and/or the number of sub-channels allocated for each PSSCH resource, the UE may allocate or determine a value indicating/representing PSSCH resource(s) differently. For convenience of description, the value indicating/representing PSSCH resource(s) may be referred to as a resource indication value (RIV). Therefore, based on the resource indication value allocated or determined differently, the receiving UE can determine/know PSSCH resource(s) allocated by the transmitting UE without ambiguity. For example, the resource indication value may be allocated or determined in an increasing order in the order of the starting sub-channel index of PSSCH resource(s), the number of sub-channels allocated for PSSCH resource(s), and the number of PSSCH resources indicated/represented by a SCI. For example, the resource indication value may be allocated or determined in a decreasing order in the order of the starting sub-channel index of PSSCH resource(s), the number of sub-channels allocated for PSSCH resource(s), and the number of PSSCH resources indicated/represented by a SCI.

For example, if the UE allocates one PSSCH resource, starting with the case where the number of sub-channels allocated for the PSSCH resource is one, as the possible starting sub-channel index increases, the resource indication value may increase. In addition, if the starting sub-channel index of the PSSCH resource reaches the maximum value for the given number of allocated sub-channels, the UE increases the number of allocated sub-channels. Thereafter, as the starting sub-channel index increases, the UE may increase the resource indication value again. In addition, if the starting sub-channel index of the PSSCH resource reaches the maximum value again, the UE may increase the number of PSSCH resources indicated/represented by the SCI. Thereafter, starting with the case where the number of sub-channels allocated for PSSCH resources is one, the UE may allocate or determine the resource indication value in the form of increasing the resource indication value based on the combination of the starting sub-channel index of the first allocated PSSCH resource and the starting sub-channel index of the second allocated PSSCH resource.

For example, if the UE allocates a greater number of PSSCH resources than the above, the above-described method may be extended as follows. Specifically, if the starting sub-channels for n allocated PSSCH resources are S_1, S_2, . . . , and S_n, respectively, the UE may allocate or determine the resource indication value in an increasing order from S_n to S_1. That is, as a value of S_n increases, the UE may increase the resource indication value. In this case, if the value of S_n reaches the maximum value, the UE may return the value of S_n to 0, and then the UE may increase a value of S_(n−1). Thereafter, as the value of S_n increases, the UE may increase the resource indication value repeatedly again. Alternatively, the UE may allocate or determine the resource indication value in an increasing order from S_1 to S_n. That is, as a value of S_1 increases, the UE may increase the resource indication value. In this case, if the value of S_1 reaches the maximum value, the UE may return the value of S_1 to 0, and then the UE may increase a value of S_2. Thereafter, as the value of S_1 increases, the UE may increase the resource indication value repeatedly again.

For example, the UE may allocate or reserve a plurality of PSSCH resources. In this case, for example, a resource value (e.g., an index of a combination of PSSCH resources) which is a one-dimensional value for expressing/representing a plurality of PSSCH resources (e.g., time-frequency resources) may be defined, and the resource value may be a value for the UE to transmit a joint time-frequency resource indication or information related to time-frequency resource(s) through a SCI. For example, if it is assumed that resource values exist from 0 to R−1, the UE may create/generate a plurality of partitions based on the number of PSSCH resources indicated/represented through a SCI (e.g., the maximum number of PSSCH resources $N_{MAX}$). In this case, for example, each of the plurality of partitions may include one or more resource values, and the number of resource values included in each of the plurality of partitions may be different. Specifically, for example, if the maximum number of PSSCH resources indicated/represented through the SCI is 3, and if the plurality of partitions include a first partition, a second partition, and a third partition, the first partition may correspond to one PSSCH resource, the second partition may correspond to two PSSCH resources, and the third partition may correspond to three PSSCH resources.

For example, as the number of PSSCH resources increases, the number of resource values included in each partition corresponding thereto may increase. For example, resource values as many as the number of sub-channels allocated for the PSSCH may be included in the first partition corresponding to one PSSCH resource.

For example, in the second partition corresponding to two PSSCH resources, the UE may generate a plurality of sub-partitions corresponding to slots of PSSCH resources based on information on the slot location of the second PSSCH resource. In this case, for example, the plurality of sub-partitions may have the same size as each other. That is, the plurality of sub-partitions may include the same number of resource values. For example, resource values for joint indication of the number of allocated sub-channels and the starting sub-channel related information of the second PSSCH resource may be included in sub-partitions corresponding to slots of PSSCH resources. Specifically, for example, the joint indication method may be to take a configuration method of a resource indication value (RIV). That is, the resource values may be in a form in which an offset value suitable for each partition is added to the RIV.

For example, in the third partition corresponding to three PSSCH resources, the UE may generate a plurality of first sub-partitions based on information on a combination of the slot location of the second PSSCH resource and the slot location of the third PSSCH resource. For example, the information on the combination of the slot locations may be represented/expressed by a form of RIV. That is, the information on the combination of the slot locations may be represented/expressed by replacing information on the first RB and the first subchannel with a slot index of the second PSSCH resource in a window including W slots (hereinafter, W slot window) and replacing information related to the number of RBs and subchannels with information related to a distance between a slot index of the second PSSCH resource and a slot index of the third PSSCH resource (i.e., the slot index of the third PSSCH resource–the slot index of the second PSSCH resource+1) in the W slot window. Specifically, in the case of interpreting the RIV value, if the distance between the slot index of the second PSSCH and the slot index of the third PSSCH within the W slot window is set to 0 (e.g., if the number of RBs is 1 based on the RIV interpretation), the UE may indicate/represent only the first PSSCH resource and the second PSSCH resource by using a SCI. For example, in the above case, a receiving UE which has received the SCI from the transmitting UE may determine that the SCI indicates/represents only the first PSSCH resource and the second PSSCH resource. That is, a frequency domain resource for the third PSSCH resource may be ignored. In the above description, although W is described in a form configured immediately after the first PSSCH resource, W may be extended to a form configured immediately before the third PSSCH resource.

Alternatively, W may be configured immediately before and after the second PSSCH resource. For example, information on a combination of slot locations may be expressed/represented by a form of RIV. Information on the first RB and the first subchannel may be replaced with a slot index of the second PSSCH resource in the W slot window, and information related to the number of RBs and subchannels may be replaced with a slot index of the third PSSCH resource in the W slot window. Through this, information on the combination of slot locations may be expressed/represented. The above method may be useful in a situation in which the UE indicates/represents the location of the first PSSCH resource located in a slot before a first time gap from the second PSSCH resource within the W slot window and indicates/represents again the location of the third PSSCH resource located in a slot after a second time gap from the second PSSCH resource. In the above case, if time allocation information is a value of 0, a SCI may indicate/represent allocation of one PSSCH resource. If time allocation information is a value of 1-31, a SCI may indicate/represent allocation of two PSSCH resources, and a slot location between two PSSCH resources may be derived by the corresponding value. In addition, subsequent value(s) may be given in a form of adding a specific offset value to the RIV method, and two piece of time gap information may be derived from the corresponding RIV value. In the above embodiment, the second PSSCH resource and the third PSSCH resource may be exchanged.

Figure 13:
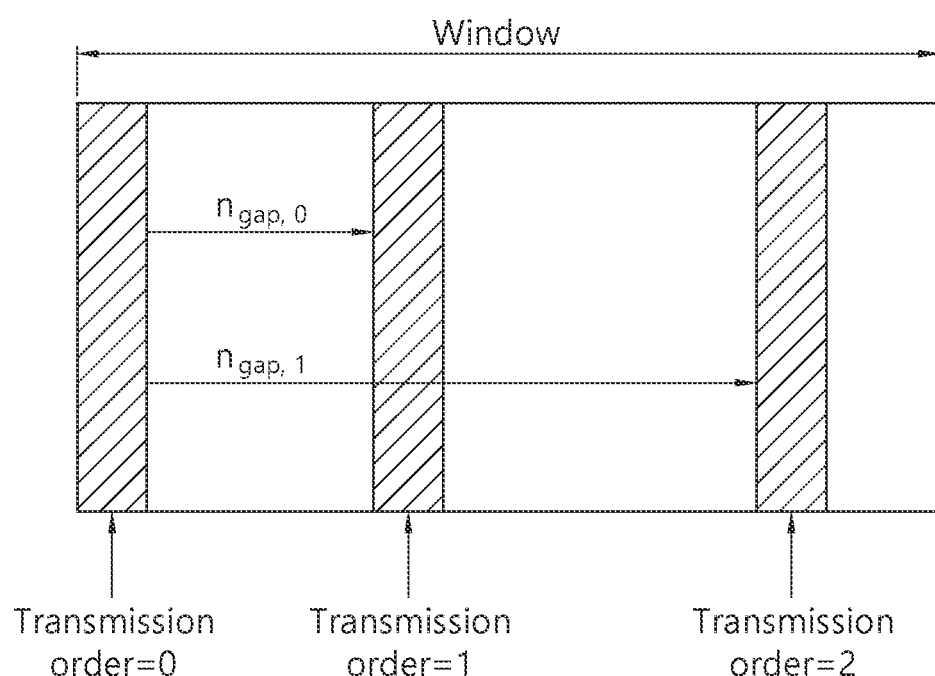
FIG. 13 shows an example in which three PSSCH resources are allocated, based on an embodiment of the present disclosure.

FIG. 13 shows an example in which three PSSCH resources are allocated, based on an embodiment of the present disclosure. The embodiment of FIG. 13 may be combined with various embodiments of the present disclosure.

For example, the UE may perform resource allocation based on Table 5 to Table 12.

TABLE 5

Considering that a SCI format 1 in LTE V2X can allocate up to two time-and-frequency resources for PSSCH transmission(s), LTE principle could be reused for $N_{MAX}$. To be specific. "Time resource assignment" field can be used to indicate the number of PSSCH resources, and/or the slot difference between two PSSCH transmissions. For instance, when the value of the time resource assignment field is 0, a single PSSCH resource is scheduled by the SCI format 0_1. When the value of the time resource assignment field is 1, 2, . . . , or 31, the slot difference between two PSSCH resources denoted by $n_{gap}$, would be 1, 2, . . . , 31, respectively. In LTE V2X, retransmission index in a SCI format 1 indicates whether the indicated $2^{nd}$ PSSCH resource is transmitted earlier or later than the $1^{st}$ PSSCH resource while the $1^{st}$ PSSCH resource is transmitted in the same subframe where the UE detects the associated SCI format 1. In a similar manner. retransmission order can be introduced for NR V2X to indicate the actual position of the $2^{nd}$ PSSCH resource compared to the $1^{st}$ PSSCH resource. For instance, if the value of the transmission order is 0, the $2^{nd}$ PSSCH will be transmitted $n_{gap}$ slots later than the $1^{st}$ PSSCH transmission slot. On the other hand, if the value of the transmission order is 1, the $2^{nd}$ PSSCH will be transmitted $n_{gap}$ slots earlier than the 1st PSSCH transmission slot.
Proposal 1: Support transmission order of PSSCH transmission to determine the position of the $2^{nd}$ PSSCH resource and the $3^{rd}$ PSSCH resource.

Referring to Table 5, in order for the receiving UE to determine locations of the second PSSCH resource and the third PSSCH resource, the transmitting UE may indicate/represent the transmission order of PSSCH transmission to the receiving UE.

Table 6 shows an example of time resource allocation in case that up to two PSSCH resources are allocated.

TABLE 6

Proposal 2: For time resource assignment, when $N_{MAX}$ is 2,
If the value is 0,
   $1^{st}$ PSSCH is transmitted in the same slot where the UE detects the associated SCI format 0_1 on PSCCH.

TABLE 6-continued

Else if value is $n_{gap}$ ($0 < n_{gap} \leq 31$),
  If retransmission order is 0,
    $1^{st}$ PSSCH is transmitted in the same slot where the UE detects the associated SCI format 0_1 on PSCCH.
    $2^{nd}$ PSSCH resource is transmitted $n_{gap}$ slots after the $1^{st}$ PSSCH transmission slot.
  Else if retransmission order is 1,
    $1^{st}$ PSSCH is transmitted in the same slot where the UE detects the associated SCI format 0_1 on PSCCH.
    $2^{nd}$ PSSCH resource is transmitted $n_{gap}$ slots before the $1^{st}$ PSSCH transmission slot Table 7 shows an example of RIV for frequency resource allocation in case that up to two PSSCH resources are allocated.

TABLE 7

Regarding the frequency resource assignment for $N_{MAX} = 2$, RIV approach could be reused as in LTE V2X. In this case, the RIV will indicate the number of sub-channels for the PSSCH transmission(s) and the starting sub-channel index of the $2^{nd}$ PSSCH resource. The starting sub-channel of the $1^{st}$ PSSCH resource will be the same as the sub-channel where the UE detect the SCI format 0_1 scheduling the PSSCH transmission(s).
Proposal 3 When $N_{MAX}$ is 2, reuse RIV interpretation for frequency resource assignment in LTE V2X.

Referring to FIG. 13, three PSSCH resources scheduled by a SCI format 0_1 will be within a window W of a resource pool. In addition, the size of the time resource assignment field in a SCI format 0_1 for $N_{MAX}=3$ assumes that the second PSSCH resource and the third PSSCH resource are within 31 slots next the slot containing the first PSSCH. In this case, when the SCI format 0_1 can indicate PSSCH resource in the past compared to the first PSSCH resource for the purpose of sensing operation, it needs to define how to interpret two time gaps derived by the time resource assignment. For simplicity, it can be considered that the time resource assignment field in a SCI format 0_1 indicates three PSSCH resources within a window, and then the transmission order field in the SCI format 0_1 indicates the order of the indicated PSSCH is associated with the SCI format 0_1. In other words, the time gaps with respect to the earliest PSSCH resource within a window are kept, and the retransmission order will be used to indicate the actual starting position of the window.

Table 8 shows an example of RIV for time resource allocation in case that up to three PSSCH resources are allocated.

TABLE 8

In addition, it is necessary to define how to indicate one or two time gaps efficiently. In our understanding, the concept of SLIV in time-domain resource allocation for PDSCH or PUSCH could be reused except that 7 is replaced with 15, 14 is replaced with 31, S is replaced with $n_{gap,0}$, and L is replaced with $(n_{gap,1} - n_{gap,0} + 1)$ In this case, if $n_{gap,0}$ equals to $n_{gap,1}$, the UE determines that the SCI format 0_1 indicates two PSSCH resources.

Proposal 4: For time resource assignment, when $N_{MAX}$ is 3,
  If the value is 0, $n_{gap,0} = n_{gap,1} = 0$
  For the value $I > 0$, $n_{gap,0}$ and $n_{gap,1}$ are determined from the value I
    if $(n_{gap,1} - n_{gap,0}) \leq 15$ then
      $I = 31 \cdot (n_{gap,1} - n_{gap,0}) + (n_{gap,0} - 1) + 1$
    Else
      $I = 31 \cdot (31 - (n_{gap,1} - n_{gap,0})) + (31 - n_{gap,0}) + 1$
    Where $n_{gap,01} \leq n_{gap,1}$ and $n_{gap,1} \leq 31$ Table 9 shows an example of RIV for time resource allocation in case that up to three PSSCH resources are allocated.

TABLE 9

Proposal 4': For time resource assignment, when $N_{MAX}$ is 3,
  If the value is 0, $n_{gap,0} = n_{gap,1} = 0$
  If the value is I ($0 < I < 32$), $n_{gap,0} = n_{gap,1} = I$ TABLE 9-continued For the value I > 31, $n_{gap,0}$ and $n_{gap,1}$ are determined from the value I
  if $(n_{gap,1} - 1) \leq 15$ then
    $I = 31 \cdot (n_{gap,1} - 1) + (n_{gap,0} - 1) + 32$
  Else
    $I = 31 \cdot (31 - (n_{gap,1} - 1)) + (31 - n_{gap,0}) + 32$
  Where $n_{gap,0} + n_{gap,1} \leq 31$ Table 10 shows a method for the UE to interpret the time interval between PSSCH resources.

TABLE 10

Proposal 5: For time resource assignment, when $N_{MAX}$ is 3.
  If the value is $n_{gap,0} = n_{gap,1} = 0$,
    $1^{st}$ PSSCH is transmitted in the same slot where the UE detects the associated SCI format 0_1 on PSCCH.
  Else if value is $n_{gap,0} = n_{gap,1} \neq 0$
    If retransmission order is 0,
      $1^{st}$ PSSCH is transmitted in the same slot where the UE detects the associated SCI format 0_1 on PSCCH.
      $2^{nd}$ PSSCH resource is transmitted $n_{gap,0}$ slots after the $1^{st}$ PSSCH transmission slot.
    Else if retransmission order is 1,
      $1^{st}$ PSSCH is transmitted in the same slot where the UE detects the associated SCI fortnat 0_1 on PSCCH.
      $2^{nd}$ PSSCH resource is transmitted $n_{gap,0}$ slots before the $1^{st}$ PSSCH transmission slot
  Else
    if "Transmission order" in the SCI format 0-1 is 0,
      $1^{st}$ PSSCH is transmitted in the same slot where the UE detects the associated SCI format 0_1 on PSCCH.
      $2^{nd}$ PSSCH resource is transmitted $n_{gap,0}$ slots after the $1^{st}$ PSSCH transmission slot.
      $3^{rd}$ PSSCH resource is transmitted $n_{gap,1}$ slots after the $1^{st}$ PSSCH transmission slot.
    Else if "Transmission order" in the SCI format 0-1 is 1,
      $1^{st}$ PSSCH is transmitted in the same slot where the UE detects the associated SCI format 0_1 on PSCCH.
      $2^{nd}$ PSSCH resource is transmitted $n_{gap,0}$ slots before the $1^{st}$ PSSCH transmission slot.
      $3^{rd}$ PSSCH resource is transmitted $n_{gap,1}$ slots after the $2^{nd}$ PSSCH transmission slot.
    Else if "Transmission order" in the SCI format 0-1 is 2,
      $1^{st}$ PSSCH is transmitted in the same slot where the UE detects the associated SCI format 0_1 on PSCCH.
      $2^{nd}$ PSSCH resource is transmitted $n_{gap,1}$ slots before the $1^{st}$ PSSCH transmission slot.
      $3^{rd}$ PSSCH resource is transmitted $n_{gap,0}$ slots after the $2^{nd}$ PSSCH transmission slot.

Table 11 shows a method for the UE to interpret the time interval between PSSCH resources.

TABLE 11

Proposal 5': For time resource assignment, when $N_{MAX}$ is 3.
  If the value is $n_{gap,0} = n_{gap,1} = 0$,
    $1^{st}$ PSSCH is transmitted in the same slot where the UE detects the associated SCI format 0_1 on PSCCH.
  Else if value is $n_{gap,0} = n_{gap,1} \neq 0$
    If retransmission order is 0,
      $1^{st}$ PSSCH is transmitted in the same slot where the UE detects the associated SCI format 0_1 on PSCCH.
      $2^{nd}$ PSSCH resource is transmitted $n_{gap,0}$ slots after the $1^{st}$ PSSCH transmission slot.
    Else if retransmission order is 1,
      $1^{st}$ PSSCH is transmitted in the same slot where the UE detects the associated SCI fortnat 0_1 on PSCCH.
      $2^{nd}$ PSSCH resource is transmitted $n_{gap,0}$ slots before the $1^{st}$ PSSCH transmission slot
  Else
    if "Transmission order" in the SCI format 0-1 is 0,
      $1^{st}$ PSSCH is transmitted in the same slot where the UE detects the associated SCI format 0_1 on PSCCH.
      $2^{nd}$ PSSCH resource is transmitted $n_{gap,0}$ slots after the $1^{st}$ PSSCH transmission slot.

TABLE 11-continued $3^{rd}$ PSSCH resource is transmitted $n_{gap,1}$ slots after the $1^{st}$ PSSCH transmission slot.
Else if "Transmission order" in the SCI format 0-1 is 1,
  $1^{st}$ PSSCH is transmitted in the same slot where the UE detects the associated SCI format 0_1 on PSCCH.
  $2^{nd}$ PSSCH resource is transmitted $n_{gap,0}$ slots before the $1^{st}$ PSSCH transmission slot.
  $3^{rd}$ PSSCH resource is transmitted $n_{gap,1}$ slots after the $1^{st}$ PSSCH transmission slot.
Else if "Transmission order" in the SCI format 0-1 is 2,
  $1^{st}$ PSSCH is transmitted in the same slot where the UE detects the associated SCI format 0_1 on PSCCH.
  $2^{nd}$ PSSCH resource is transmitted $n_{gap,1}$ slots before the $1^{st}$ PSSCH transmission slot.
  $3^{rd}$ PSSCH resource is transmitted $n_{gap,0}$ slots after the $1^{st}$ PSSCH transmission slot.

Table 12 shows an example of RIV for frequency resource allocation in case that up to three PSSCH resources are allocated.

TABLE 12

Regarding the frequency resource assignment for $N_{MAX} = 3$, RIV mechanism needs to be modified to be capable of indicating two starting sub-channel index for the $2^{nd}$ PSSCH resource and the $3^{rd}$ PSSCH resource and the number of sub-channels for PSSCH transmission(s). Depending on the number of allocated sub-channels, the possible number of a combination of two starting sub-channel index is determined. For instance, when the number of allocated sub-channels is 1, then the combination of starting sub-channel index $(n_{subCH,0}^{start}, n_{subCH,1}^{start})$ can be $(0, 0), (0, 1), \ldots, (0, N_{subCH} - 1), (1, 0), (1, 1), \ldots, (1, N_{subCH} - 1), \ldots,$ or $(N_{subCH} - 1, N_{subCH} - 1)$ where $N_{subCH}$ is the number of sub-channels in a resource pool. On the other hand, when the number of allocated sub-channels is $N_{subCH}$, then the combination of starting sub-channel index $(n_{subCH,0}^{start}, n_{subCH,1}^{start})$ would be $(0, 0)$. In our understanding, the number of possible combinations of the starting sub-channel index is $(N_{subCH} - n)^2$ where n is the number of allocated sub-channels for PSSCH transmission. In this case, the resource indication value for $N_{MAX} = 3$ is determined first in an ascending order of the starting sub-channel index of the $3^{rd}$ PSSCH resource and second in an ascending order of the starting sub-channel index of the $2^{nd}$ PSSCH resource and third in an ascending order of the number of sub-channels for PSSCH transmission(s).
Proposal 6: When $N_{MAX}$ is 3, RIV is determined as follows:
  If $L_{subCH} = 1$
    $RIV = L_{subCH} \cdot n_{subCH,0}^{start} + n_{subCH,1}^{start}$
  Else
    $RIV = \sum_{n=0}^{L_{subCH}-2} (N_{subCH} - n)^2 + (L_{subCH} \cdot n_{subCH,0}^{start} + n_{subCH,1}^{start})$
  Where $L_{subCH}$ is the number of allocated sub-channels, $n_{subCH,0}^{start}$ or $n_{subCH,1}^{start}$ is starting sub-channel index of the $2^{nd}$ PSSCH resource or the $3^{rd}$ PSSCH resource respectively, $N_{subCH}$ is the total number of sub-channels in the resource pool.

For example, the UE may select/determine a specific first sub-partition based on a value related to the information on the combination of slot locations. The UE may create/generate a plurality of second sub-partitions, based on the number of allocated subchannels and a starting subchannel of the second PSSCH resource, in the first sub-partition selected/determined based on the value related to the information on the combination of slot locations. In this case, for example, the sizes of the plurality of second sub-partitions may be different. For example, as the number of subchannels allocated for the PSSCH increases, the size of the corresponding second sub-partition may decrease. That is, as the number of subchannels allocated for the PSSCH increases, a resource value included in the corresponding second sub-partition may decrease. For example, the UE may select/determine a specific second sub-partition based on the number of the subchannels. For example, a resource value which simultaneously indicates/represents a starting subchannel of the second PSSCH resource and a starting subchannel of the third PSSCH resource may be included in the specific second sub-partition selected/determined based on the number of subchannels. For example, the resource value to indicate simultaneously may be (M−m+1)S2+S3. Herein, a value of M may be the number of subchannels included in a resource pool, and a value of m may be the number of subchannels allocated for a PSSCH, and a value of S2 may be a value (e.g., an index) related to a starting subchannel of the second PSSCH resource (or the third PSSCH resource), and a value of S3 may be a value related to a starting subchannel of the third PSSCH resource (or the second PSSCH resource).

For example, it is assumed that the number of resources indicated/represented by a transmitting UE to receiving UE(s) through a SCI is 3, the number of subchannels included in a resource pool is M, the number of allocated subchannels is m, and a starting subchannel of the second PSSCH resource or the third PSSCH resource is S2 or S3, respectively. In this case, if the number of allocated subchannels is 1 (i.e., m=1), a frequency related resource indication value may be M*S2+S3 or M*S3+S2. For example, if the number of allocated subchannels exceeds 1 (i.e., m>1), a frequency related resource indication value may be obtained based on one of Equation 7 to Equation 9 below.

[Equation 7]

$$\text{frequency related resource indication value} = \sum_{n=0}^{m-2}(M-n)^2 + (mS_2 + S_3)$$

[Equation 8]

$$\text{frequency related resource indication value} = \sum_{n=0}^{m-2}(M-n)^2 + (mS_3 + S_2)$$

[Equation 9]

$$\text{frequency related resource indication value} =$$
$$S_2 + S_3 \cdot (M+1-m) + \sum_{n=1}^{m-1}(M+1-n)^2$$

For example, it is assumed that the number of resources indicated/represented by a transmitting UE to receiving UE(s) through a SCI is 2, the number of subchannels included in a resource pool is M, the number of allocated subchannels is m, and a starting subchannel of the second PSSCH resource is S2. In this case, if the number of allocated subchannels is 1 (i.e., m=1), a frequency related resource indication value may be S2. For example, if the number of allocated subchannels exceeds 1 (i.e., m>1), a frequency related resource indication value may be obtained based on Equation 10 or Equation 11 below.

[Equation 10]

$$\text{frequency related resource indication value} = \sum_{n=0}^{m-2}(M-n) + S_2$$

[Equation 11]

$$\text{frequency related resource indication value} = \sum_{n=1}^{m-1}(M+1-n) + S_2$$

For example, the UE may perform resource allocation based on Table 13 to Table 17.

Table 13 shows an example of resource allocation in a time domain.

TABLE 13

The UE shall transmit the PSSCH in the same slot as the associated PSCCH.
The minimum resource allocation unit in the time domain is a slot.
The UE shall transmit the PSSCH in consecutive symbols within the slot, subject to the following restrictions.
The UE shall not transmit PSSCH in symbols which are not configured for sidelink. A symbol is configured for sidelink, according to higher layer parameters startSLsymbols and lengthSLsymbols, where startSLsymbols is the symbol index of the first symbol of lengthSLsymbols consecutive symbols configured for sidelink,
Within the slot, PSSCH resource allocation starts at symbol startSLsymbols + 1.
The UE shall not transmit PSSCH in symbols which are configured for use by PSFCH, if
PSFCH is configured in this slot.
The UE shall not transmit PSSCH in the last symbol configured for sidelink.
The UE shall not transmit PSSCH in the symbol immediately preceding the symbols which are configured for use by PSFCH, if PSFCH is configured in this slot.
In sidelink resource allocation mode 1:
For sidelink dynamic grant, the PSSCH transmission is scheduled by a DCI format 3_0.
For sidelink configured grant type 2, the configured grant is activated by a DCI format 3_0.
For sidelink dynamic grant and sidelink configured grant type 2:
The "Time gap" field value m of the DCI format 3_0 provides an index m + 1 into a slot offset table. That table is given by higher layer parameter timeGapFirstSidelinkTransmission and the table value at index m + 1 will be referred to as slot offset $K_{SL}$.
The slot of the first sidelink transmission scheduled by the DCI is the first SL slot of the corresponding resource pool that starts not earlier than $$T_{DL} - \frac{T_{TA}}{2} \times T_c + K_{SL} \times T_{slot} \text{ where}$$

$TD_L$ is starting time of the downlink slot carrying the corresponding DCI, $T_{TA}$ is the timing advance value and $K_{SL}$ is the slot offset between the slot DCI and the first sidelink transmission scheduled by DCI, $T_c$ is as defined in 38.211, and $T_{slot}$ is the SL slot duration.
For sidelink configured grant type 1:
The slot of the first sidelink transmissions follows the higher layer configuration according to 3GPP TS 38.321 V16.0.0.

Table 14 shows an example of a UE procedure for determining a time interval between first PSSCH transmission related to a SCI format 0_1 and another PSSCH transmission.

TABLE 14

"Time resource assignment" field in the SCI format 0-1 indicates the number of PSSCH resources indicated by the SCI format 0-1, and the slot offset with respect to the slot containing first PSSCH resource.
When maxNumResource equals to 2,
    if "Time resource assignment" field in the SCI format 0-1 equals 0, a single PSSCH resource is scheduled by the SCI format 0-1.
    if "Time resource assignment" field in the SCI format 0-1 is larger than 1, two PSSCH resources are scheduled by the SCI format 0-1, and the slot offset $n_{gap}$ between first PSSCH resource and second PSSCH resource equals the value of "Time resource assignment" field in the SCI format 0-1.
When maxNumResource equals to 3,
    if "Time resource assignment" field in the SCI format 0-1 equals 0, a single PSSCH resource is scheduled by the SCI format 0-1.
    if "Time resource assignment" field in the SCI format 0-1 is larger than or equal to 1, two or three PSSCH resources are scheduled by the SCI format 0-1, and the slot offsets $n_{gap,0}$ and $n_{gap,1}$ for second PSSCH resource and third PSSCH resource with respect to first PSSCH resource are determined from the time gap value I /which is equals to "Time resource assignment" field in the SCI format 0-1:

TABLE 14-continued if $(n_{gap,1} - n_{gap,0}) \leq 15$ then
    $I = 31 \cdot (n_{gap,1} - n_{gap,0}) + (n_{gap,0} - 1) + 1$
else
    $I = 31 \cdot (31 - (n_{gap,1} - n_{gap,0})) + (31 - n_{gap,0}) + 1$
where $n_{gap,01} \leq n_{gap,1}$ and $n_{gap,1} \leq 31$
if $n_{gap,1}$ equals to $n_{gap,0}$, two PSSCH resources are scheduled by the SCI format 0-1.
otherwise, three PSSCH resources are scheduled by the SCI format 0-1.

Table 15 shows an example of resource allocation in a frequency domain.

TABLE 15

The resource allocation unit in the frequency domain is the sub-channel.
The sub-channel assignment for sidelink transmission is determined using the "Frequency resource assignment" field in the associated SCI.
The lowest sub-channel for sidelink transmission is the sub-channel on which the lowest PRB of the associated PSCCH is transmitted.
If a PSSCH scheduled by a PSCCH would overlap with resources containing the PSCCH, the resources corresponding to a union of the PSCCH that scheduled the PSSCH and associated PSCCH DM RS are not available for the PSSCH.

Table 16 shows an example of RIV for frequency resource allocation in case that up to two PSSCH resources are allocated.

TABLE 16

"Frequency resource assignment" field in the SCI format 0-1 is equal to resource indication value (RIV) corresponding to a starting sub-channel index ($n_{subCH}^{start}$) and a length in terms of contiguously allocated sub-channels ($L_{subCH} \geq 1$). The resource indication value is defined by
    if $(L_{subCH} - 1) \leq \lfloor N_{subCH}/2 \rfloor$ then
        $RIV = N_{subCH} (L_{subCH} - 1) + n_{subCH}^{start}$
    else
        $RIV = N_{subCH} (N_{subCH} - L_{subCH} + 1) + (N_{subCH} - 1 - n_{subCH}^{start})$
where $N_{subCH}$ is the total number of sub-channels in the pool determined by higher layer parameter numSubchannel.
For the SCI format 0-1 transmitted on sub-channel m in slot $t_n^{SL}$, the set of slots and sub-channels for the corresponding PSSCH are determined as follows:
    if $n_{gap}$ is zero,
        the time and frequency resources for the corresponding PSSCH is given by
            sub-channel(s) m, m + 1, . . . , m + $L_{subCH}$ − 1 in slot $t_n^{SL}$.
    else if "Transmission order" in the SCI format 0-1 is 0,
        the time and frequency resources for the corresponding PSSCH is given by
            sub-channel(s) m, m + 1, . . . , m + $L_{subCH}$ − 1 in slot $t_n^{SL}$, and
            sub-channels $n_{subCH}^{start}$, $n_{subCH}^{start}$ + 1, . . . , $n_{subCH}^{start}$ + $L_{subCH}$ − 1 in slot $t_{n+n_{gap}}^{SL}$.
    else if "Transmission order" in the SCI format 0-1 is 1,
        the time and frequency resources for the corresponding PSSCH is given by
            sub-channels $n_{subCH}^{start}$, $n_{subCH}^{start}$ + 1, . . . , $n_{subCH}^{start}$ + $L_{subCH}$ − 1 in slot $t_{n-n_{gap}}^{SL}$, and
            sub-channel(s) m, m + 1, . . . , m + $L_{subCH}$ − 1 in slot $t_n^{SL}$.
where $n_{gap}$ is the value indicated by "Time resource assignment" field the SCI format 0-1 and $(t_0^{SL}, t_1^{SL}, t_2^{SL}, \ldots)$ is determined by Clause x.x.x.

Table 17 shows an example of RIV for frequency resource allocation in case that up to three PSSCH resources are allocated.

TABLE 17

"Frequency resource assignment" field in the SCI format 0-1 is equal to resource indication value (RIV) corresponding to starting sub-channel indexes ($n_{subCH,0}^{start}$, $n_{subCH,1}^{start}$) and a length in terms of contiguously allocated sub-channels ($L_{subCH} \geq 1$). The resource indication value is defined by
    if $L_{subCH} = 1$ then
        $RIV = L_{subCH} \cdot n_{subCH,0}^{start} + n_{subCH,1}^{start}$
    else
        $RIV = \Sigma_{n=0}^{L_{subCH}-2}(N_{subCH} - n)^2 + (L_{subCH} \cdot n_{subCH,0}^{start} + n_{subCH,1}^{start})$
where $N_{subCH}$ is the total number of sub-channels in the pool determined by higher layer parameter numSubchannel.

TABLE 17-continued

For the SCI format 0-1 transmitted on sub-channel m in slot $t_n^{SL}$, the set of slots and sub-channels for the corresponding PSSCH are determined as follows:

if $n_{gap}$ is zero,
        the time and frequency resources for the corresponding PSSCH is given by
            sub-channel(s) m, m + 1, . . . , m + $L_{subCH}$ − 1 in slot $t_n^{SL}$.
    else if $n_{gap,0} = n_{gap,1}$
        if "Transmission order" in the SCI format 0-1 is 00,
            the time and frequency resources for the corresponding PSSCH is given by
                sub-channel(s) m, m + 1, . . . , m + $L_{subCH}$ − 1 in slot $t_n^{SL}$, and
                sub-channels $n_{subCH,0}^{start}$, $n_{subCH,0}^{start} + 1$, . . . , $n_{subCH,0}^{start} + L_{subCH} - 1$ in slot $t_{n+n_{gap,0}}^{SL}$.
        else if "Transmission order" in the SCI format 0-1 is 01,
            the time and frequency resources for the corresponding PSSCH is given by
                sub-channels $n_{subCH,0}^{start}$, $n_{subCH,0}^{start} + 1$, . . . , $n_{subCH,0}^{start} + L_{subCH} - 1$ in slot $t_{n-n_{gap,0}}^{SL}$, and
                sub-channel(s) m, m + 1, . . . , m + $L_{subCH}$ − 1 in slot $t_n^{SL}$.
    else
        if "Transmission order" in the SCI format 0-1 is 00,
            the time and frequency resources for the corresponding PSSCH is given by
                sub-channel(s) m, m + 1, . . . , m + $L_{subCH}$ − 1 in slot $t_n^{SL}$, and
                sub-channels $n_{subCH,0}^{start}$, $n_{subCH,0}^{start} + 1$, . . . , $n_{subCH,0}^{start} + L_{subCH} - 1$ in slot $t_{n+n_{gap,0}}^{SL}$, and
                sub-channels $n_{subCH,1}^{start}$, $n_{subCH,1}^{start} + 1$, . . . , $n_{subCH,1}^{start} + L_{subCH} - 1$ in slot $t_{n+n_{gap,1}}^{SL}$.
        else if "Transmission order" in the SCI format 0-1 is 01,
            the time and frequency resources for the corresponding PSSCH is given by
                sub-channels $n_{subCH,0}^{start}$, $n_{subCH,0}^{start} + 1$, . . . , $n_{subCH,0}^{start} + L_{subCH} - 1$ in slot $t_{n-n_{gap,0}}^{SL}$, and
                sub-channel(s) m, m + 1, . . . , m + $L_{subCH}$ − 1 in slot $t_n^{SL}$, and
                sub-channels $n_{subCH,1}^{start}$, $n_{subCH,1}^{start} + 1$, . . . , $n_{subCH,1}^{start} + L_{subCH} - 1$ in slot $t_{n-n_{gap,0}+n_{gap,1}}^{SL}$.
        else if "Transmission order" in the SCI format 0-1 is 11,
            the time and frequency resources for the corresponding PSSCH is given by
                sub-channels $n_{subCH,0}^{start}$, $n_{subCH,0}^{start} + 1$, . . . , $n_{subCH,0}^{start} + L_{subCH} - 1$ in slot $t_{n-n_{gap,1}}^{SL}$, and
                sub-channels $n_{subCH,1}^{start}$, $n_{subCH,1}^{start} + 1$, . . . , $n_{subCH,1}^{start} + L_{subCH} - 1$ in slot $t_{n+n_{gap,0}-n_{gap,1}}^{SL}$,
and
                sub-channel(s) m, m + 1, . . . , m + $L_{subCH}$ − 1 in slot $t_n^{SL}$.
where $n_{gap,0}$ and $n_{gap,1}$ are determined by Table 14 and $(t_0^{SL}, t_1^{SL}, t_2^{SL}, \ldots)$ is determined by Clause x.x.x.

For example, as described above, in case that time-axis information is given in the form of RIV, the UE may assume or determine that only two PSSCH resources can be scheduled through a SCI if time gaps for the second resource and the third resource are set to be the same. For example, in information related to frequency assignment indicated/represented in a SCI, actual transmission orders of information on the second starting subchannel and the third starting subchannel may be different based on transmission order information.

Based on an embodiment of the present disclosure, the transmitting UE may inform receiving UE(s) of information related to PSSCH resource(s) before a SCI transmission time as well as information related to PSSCH resource(s) after the SCI transmission time through the SCI. Therefore, even if the receiving UE(s) fails to receive or fails to decode some SCI, the receiving UE(s) can obtain information related to PSSCH resource(s) and efficiently perform the sensing operation.

For convenience of explanation above, examples in which the transmitting UE transmits information related to resource(s) for sidelink data channel transmission (e.g., the number of PSSCH resources, the retransmission index, and/or the RV value) to the receiving UE(s) through a SCI has been described. However, the technical idea of the present disclosure is not limited thereto, and may also be applied to communication between a base station and a UE.

For example, the base station may transmit information related to resource(s) for transmission of sidelink data channel(s) to the UE. For example, the information related to resource(s) for transmission of sidelink data channel(s) may be transmitted from the base station to the UE through physical layer signaling (e.g., DCI). For example, the information related to resource(s) for transmission of sidelink data channel(s) may be transmitted from the base station to the UE through higher layer signaling (e.g., MAC signaling or RRC signaling).

For example, the base station transmits information related to resource(s) for transmission of downlink data channel(s) (e.g., the number of Narrowband Physical Downlink Shared Channel (NPDSCH) resources, the number of PDSCH resources, the retransmission index and/or the RV value) to the UE. For example, the information related to resource(s) for transmission of downlink data channel(s) may be transmitted from the base station to the UE through physical layer signaling (e.g., DCI). For example, the information related to resource(s) for transmission of downlink data channel(s) may be transmitted from the base station to the UE through higher layer signaling (e.g., MAC signaling or RRC signaling).

For example, the base station transmits information related to resource(s) for transmission of uplink data channel(s) (e.g., the number of Narrowband Physical Uplink Shared Channel (NPUSCH) resources, the number of PUSCH resources, the retransmission index and/or the RV value) to the UE. For example, the information related to resource(s) for transmission of uplink data channel(s) may be transmitted from the base station to the UE through physical layer signaling (e.g., DCI). For example, the information related to resource(s) for transmission of uplink data channel(s) may be transmitted from the base station to the UE through higher layer signaling (e.g., MAC signaling or RRC signaling).

FIG. 14 shows a method for a transmitting UE to transmit sidelink control information, based on an embodiment of the present disclosure. The embodiment of FIG. 14 may be combined with various embodiments of the present disclosure.

Referring to FIG. 14, in step S1410, the transmitting UE may transmit sidelink control information including information related to resource(s) for transmission of sidelink data channel(s) of the transmitting UE to a receiving UE.

For example, resource(s) for transmission of sidelink data channel(s) of the transmitting UE may be a plurality of PSSCH resources. For example, information related to resource(s) for transmission of sidelink data channel(s) of the transmitting UE may be an index. For example, information related to resource(s) for transmission of sidelink data channel(s) of the transmitting UE may be an RV value. The proposed method can be applied to the device(s) described below.

Figure 15:
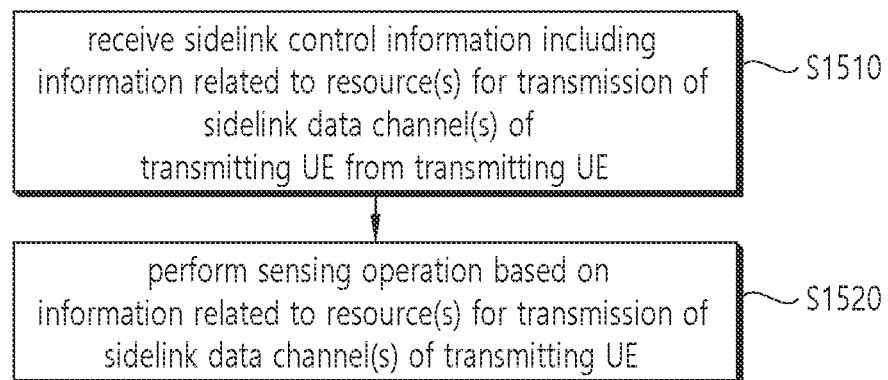
FIG. 15 shows a method for a receiving UE to receive sidelink control information, based on an embodiment of the present disclosure.

FIG. 15 shows a method for a receiving UE to receive sidelink control information, based on an embodiment of the present disclosure. The embodiment of FIG. 15 may be combined with various embodiments of the present disclosure.

Referring to FIG. 15, in step S1510, the receiving UE may receive sidelink control information including information related to resource(s) for transmission of sidelink data channel(s) of a transmitting UE from the transmitting UE. In step S1520, the receiving UE may perform a sensing operation based on information related to resource(s) for transmission of sidelink data channel(s) of the transmitting UE.

For example, resource(s) for transmission of sidelink data channel(s) of the transmitting UE may be a plurality of PSSCH resources. For example, information related to resource(s) for transmission of sidelink data channel(s) of the transmitting UE may be an index. For example, information related to resource(s) for transmission of sidelink data channel(s) of the transmitting UE may be an RV value. The proposed method can be applied to the device(s) described below.

Figure 16:
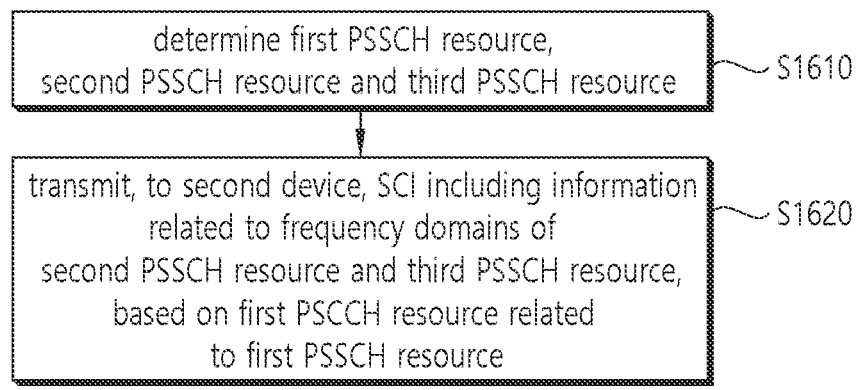
FIG. 16 shows a method for a first device to perform wireless communication, based on an embodiment of the present disclosure.

FIG. 16 shows a method for a first device to perform wireless communication, based on an embodiment of the present disclosure. The embodiment of FIG. 16 may be combined with various embodiments of the present disclosure.

Referring to FIG. 16, in step S1610, the first device may determine a first physical sidelink shared channel (PSSCH) resource, a second PSSCH resource and a third PSSCH resource. In step S1620, the first device may transmit, to a second device, a sidelink control information (SCI) including information related to frequency domains of the second PSSCH resource and the third PSSCH resource, based on a first physical sidelink control channel (PSCCH) resource related to the first PSSCH resource. For example, the information related to frequency domains may be obtained based on a number of subchannels included in a resource pool, an index of a starting subchannel of the second PSSCH resource, an index of a starting subchannel of the third PSSCH resource, a number of subchannels included in the second PSSCH resource, and a number of subchannels included in the third PSSCH resource, and the information related to frequency domains may be a zero or a positive integer.

For example, the information related to frequency domains may represent a combination of the index of the starting subchannel of the second PSSCH resource, the index of the starting subchannel of the third PSSCH resource, the number of subchannels included in the second PSSCH resource, and the number of subchannels included in the third PSSCH resource.

For example, the information related to frequency domains may increase based on an increase in the index of the starting subchannel of the second PSSCH resource or the index of the starting subchannel of the third PSSCH resource, and the information related to frequency domains may increase based on an increase in the number of subchannels included in the second PSSCH resource or the number of subchannels included in the third PSSCH resource.

For example, based on the second PSSCH resource and the third PSSCH resource including N subchannels, the information related to frequency domains may increase in an ascending order of the index of the starting subchannel of the second PSSCH resource, and then increase in an ascending order of the index of the starting subchannel of the third PSSCH resource. Thereafter, based on the index of the starting subchannel reaching a maximum value, N may increase to N+1. Thereafter, based on the second PSSCH resource and the third PSSCH resource including N+1 subchannels, the information related to frequency domains may increase in an ascending order of the index of the starting subchannel of the second PSSCH resource, and then increase in an ascending order of the index of the starting subchannel of the third PSSCH resource. Herein, N may be a positive integer.

For example, the first PSSCH resource may be a resource located in a time domain before the second PSSCH resource and the third PSSCH resource.

For example, the first PSSCH resource may be a resource located in a time domain after the second PSSCH resource or the third PSSCH resource.

For example, the first PSSCH resource, the second PSSCH resource, and the third PSSCH resource may be determined based on sensing.

Additionally, for example, the first device may receive, from a base station, information related to the first PSSCH resource, the second PSSCH resource, and the third PSSCH resource. Herein, the first PSSCH resource, the second PSSCH resource and the third PSSCH resource may be determined based on the information.

For example, the SCI may include information related to time domains of the second PSSCH resource and the third PSSCH resource, and the information related to time domains may be a zero or a positive integer. For example, the information related to time domains may be obtained based on a number of slots between the first PSSCH resource and the second PSSCH resource, a number of slots between the first PSSCH resource and the third PSSCH resource, and a number of slots included in a window, and the first PSSCH resource may be a resource located in a time domain before the second PSSCH resource and the third PSSCH resource. For example, the information related to time domains may be obtained based on a number of slots between the second PSSCH resource and the first PSSCH resource, a number of slots between the second PSSCH resource and the third PSSCH resource, and a number of slots included in a window, and the second PSSCH resource may be a resource located in a time domain before the first PSSCH resource and the third PSSCH resource.

The proposed method can be applied to device(s) described below. First, the processor 102 of the first device 100 may determine a first physical sidelink shared channel (PSSCH) resource, a second PSSCH resource and a third PSSCH resource. In addition, the processor 102 of the first device 100 may control the transceiver 106 to transmit, to a second device 200, a sidelink control information (SCI) including information related to frequency domains of the second PSSCH resource and the third PSSCH resource, based on a first physical sidelink control channel (PSCCH) resource related to the first PSSCH resource. For example, the information related to frequency domains may be obtained based on a number of subchannels included in a resource pool, an index of a starting subchannel of the second PSSCH resource, an index of a starting subchannel of the third PSSCH resource, a number of subchannels included in the second PSSCH resource, and a number of subchannels included in the third PSSCH resource, and the information related to frequency domains may be a zero or a positive integer.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: determine a first physical sidelink shared channel (PSSCH) resource, a second PSSCH resource and a third PSSCH resource; and transmit, to a second device, a sidelink control information (SCI) including information related to frequency domains of the second PSSCH resource and the third PSSCH resource, based on a first physical sidelink control channel (PSCCH) resource related to the first PSSCH resource. For example, the information related to frequency domains may be obtained based on a number of subchannels included in a resource pool, an index of a starting subchannel of the second PSSCH resource, an index of a starting subchannel of the third PSSCH resource, a number of subchannels included in the second PSSCH resource, and a number of subchannels included in the third PSSCH resource, and the information related to frequency domains may be a zero or a positive integer.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: determine a first physical sidelink shared channel (PSSCH) resource, a second PSSCH resource and a third PSSCH resource; and transmit, to a second UE, a sidelink control information (SCI) including information related to frequency domains of the second PSSCH resource and the third PSSCH resource, based on a first physical sidelink control channel (PSCCH) resource related to the first PSSCH resource. For example, the information related to frequency domains may be obtained based on a number of subchannels included in a resource pool, an index of a starting subchannel of the second PSSCH resource, an index of a starting subchannel of the third PSSCH resource, a number of subchannels included in the second PSSCH resource, and a number of subchannels included in the third PSSCH resource, and the information related to frequency domains may be a zero or a positive integer.

Based on an embodiment of the present disclosure, a nontransitory computer-readable storage medium storing instructions may be provided. For example, the instructions, when executed, may cause a first device to: determine a first physical sidelink shared channel (PSSCH) resource, a second PSSCH resource and a third PSSCH resource; and transmit, to a second device, a sidelink control information (SCI) including information related to frequency domains of the second PSSCH resource and the third PSSCH resource, based on a first physical sidelink control channel (PSCCH) resource related to the first PSSCH resource. For example, the information related to frequency domains may be obtained based on a number of subchannels included in a resource pool, an index of a starting subchannel of the second PSSCH resource, an index of a starting subchannel of the third PSSCH resource, a number of subchannels included in the second PSSCH resource, and a number of subchannels included in the third PSSCH resource, and the information related to frequency domains may be a zero or a positive integer.

Figure 17:
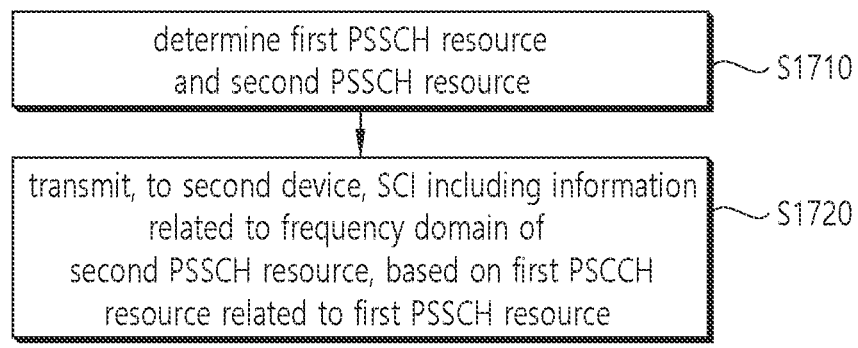
FIG. 17 shows a method for a first device to perform wireless communication, based on an embodiment of the present disclosure.

FIG. 17 shows a method for a first device to perform wireless communication, based on an embodiment of the present disclosure. The embodiment of FIG. 17 may be combined with various embodiments of the present disclosure.

Referring to FIG. 17, in step S1710, the first device may determine a first physical sidelink shared channel (PSSCH) resource and a second PSSCH resource. In step S1720, the first device may transmit, to a second device, a sidelink control information (SCI) including information related to a frequency domain of the second PSSCH resource, based on a first physical sidelink control channel (PSCCH) resource related to the first PSSCH resource. For example, the information related to the frequency domain of the second PSSCH resource may be obtained based on a number of subchannels included in a resource pool, an index of a starting subchannel of the second PSSCH resource, and a number of subchannels included in the second PSSCH resource, and the information related to the frequency domain of the second PSSCH resource may be a zero or a positive integer.

For example, the information related to the frequency domain of the second PSSCH resource may represent a combination of the index of the starting subchannel of the second PSSCH resource and the number of subchannels included in the second PSSCH resource.

For example, the information related to the frequency domain of the second PSSCH resource may be obtained based on following equations.

The information related to the frequency domain=$S_2$, if m=1 The information related to the $$\text{frequency domain} = \sum_{n=1}^{m-1}(M+1-n)+S_2,$$

if m>1

Herein, m may be the number of subchannels included in the second PSSCH resource, M may be the number of subchannels included in the resource pool, and $S_2$ may be the index of the starting subchannel of the second PSSCH resource.

The proposed method can be applied to device(s) described below. First, the processor 102 of the first device 100 may determine a first physical sidelink shared channel (PSSCH) resource and a second PSSCH resource. In addition, the processor 102 of the first device 100 may control the transceiver 106 to transmit, to a second device, a sidelink control information (SCI) including information related to a frequency domain of the second PSSCH resource, based on a first physical sidelink control channel (PSCCH) resource related to the first PSSCH resource. For example, the information related to the frequency domain of the second PSSCH resource may be obtained based on a number of subchannels included in a resource pool, an index of a starting subchannel of the second PSSCH resource, and a number of subchannels included in the second PSSCH resource, and the information related to the frequency domain of the second PSSCH resource may be a zero or a positive integer.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
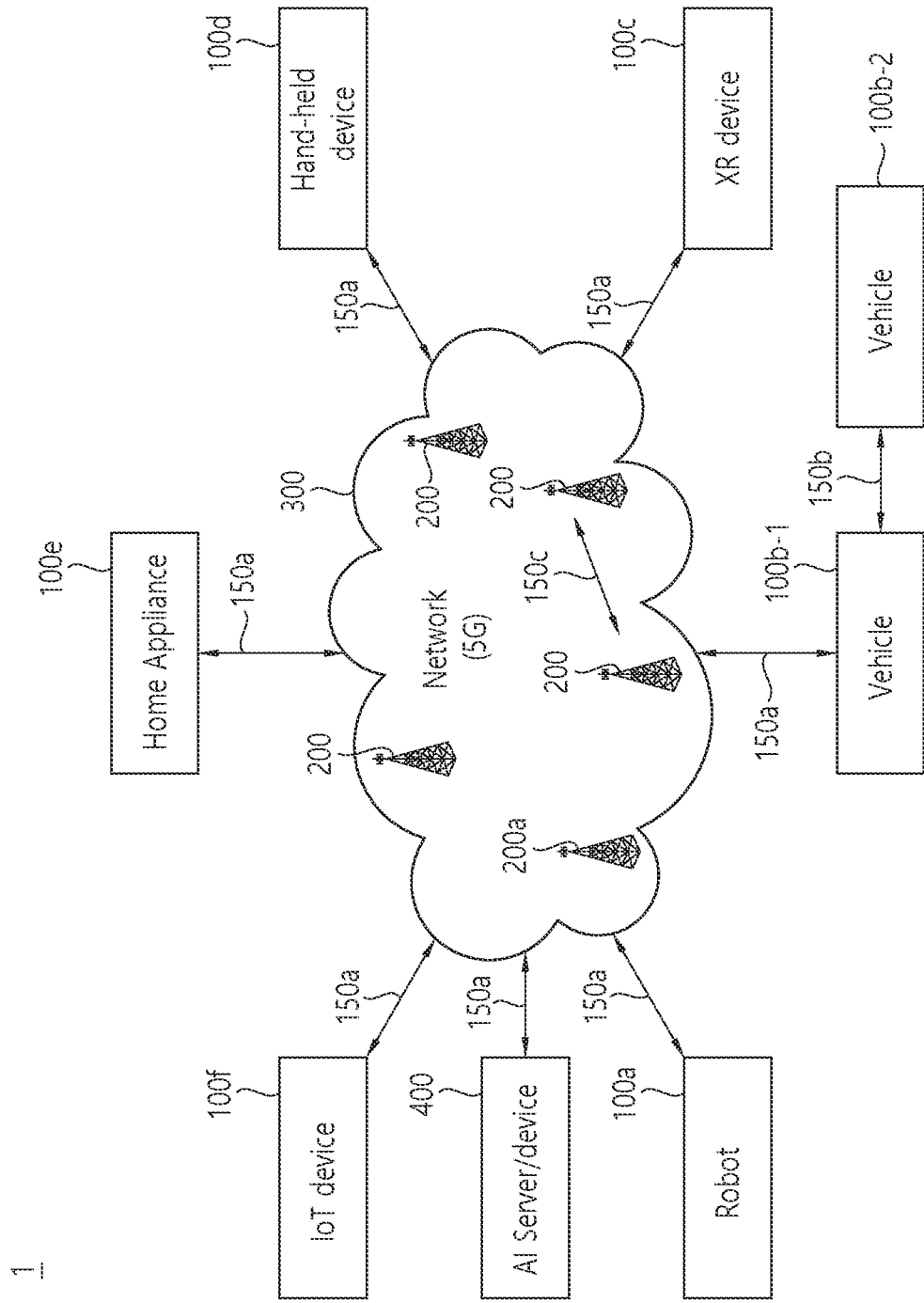
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
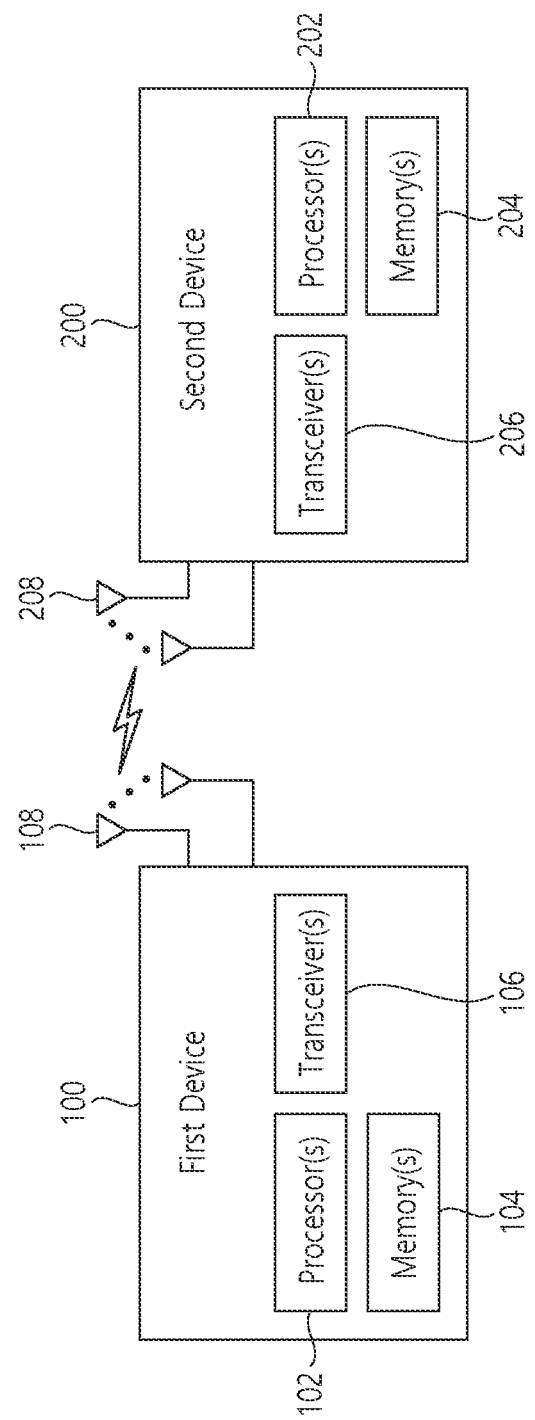
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
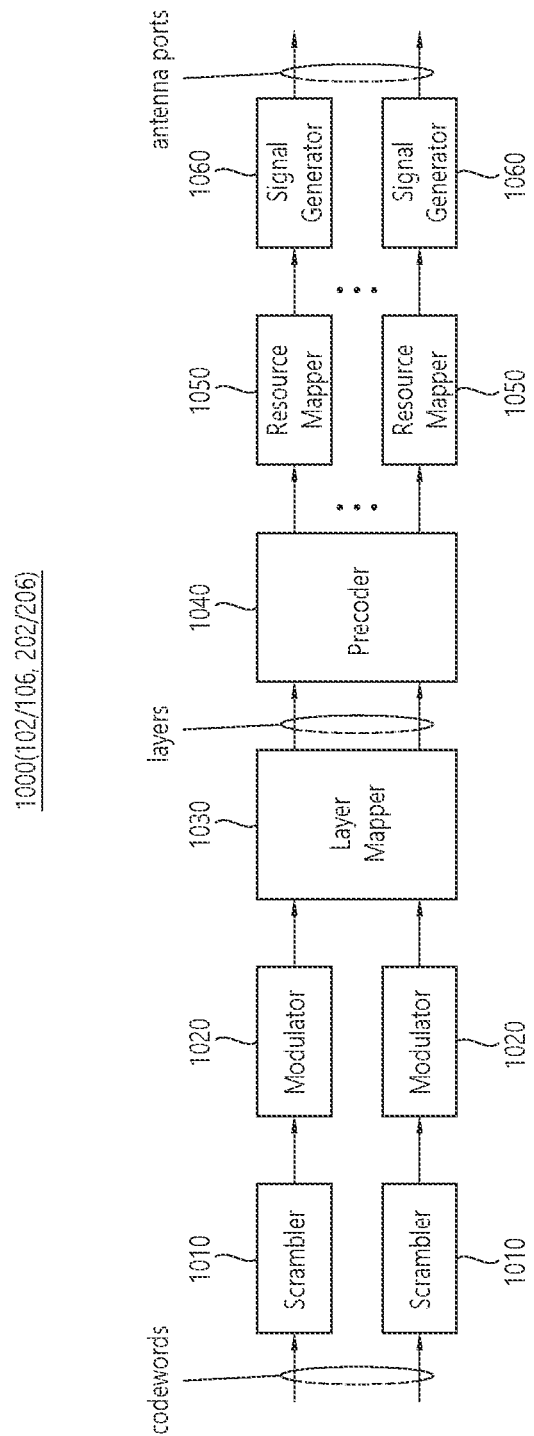
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
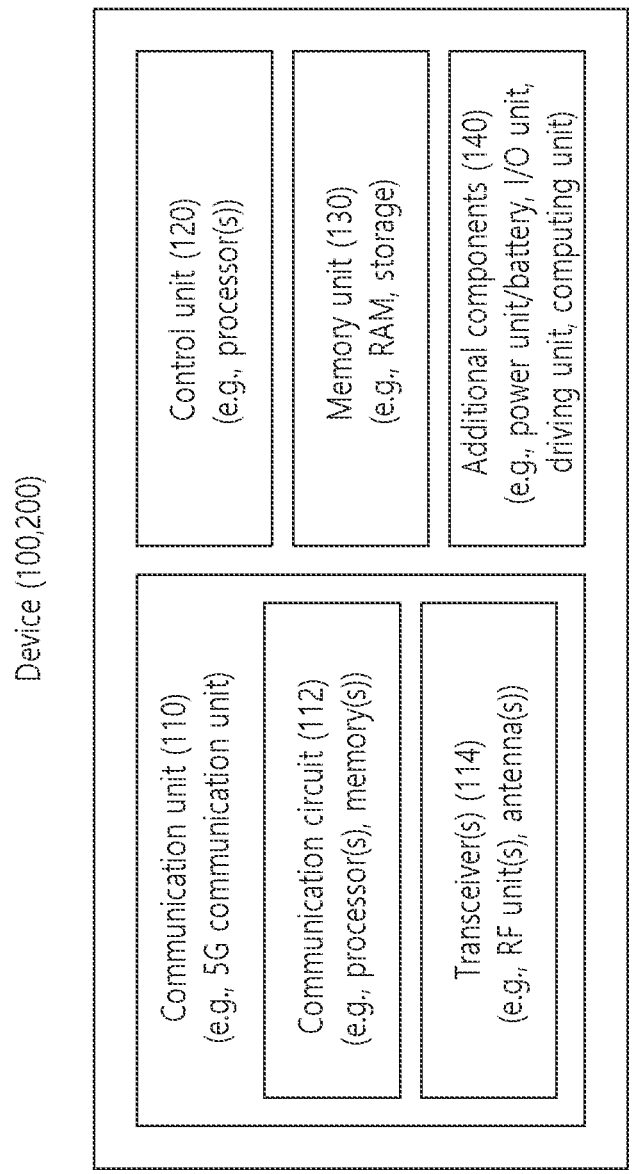
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
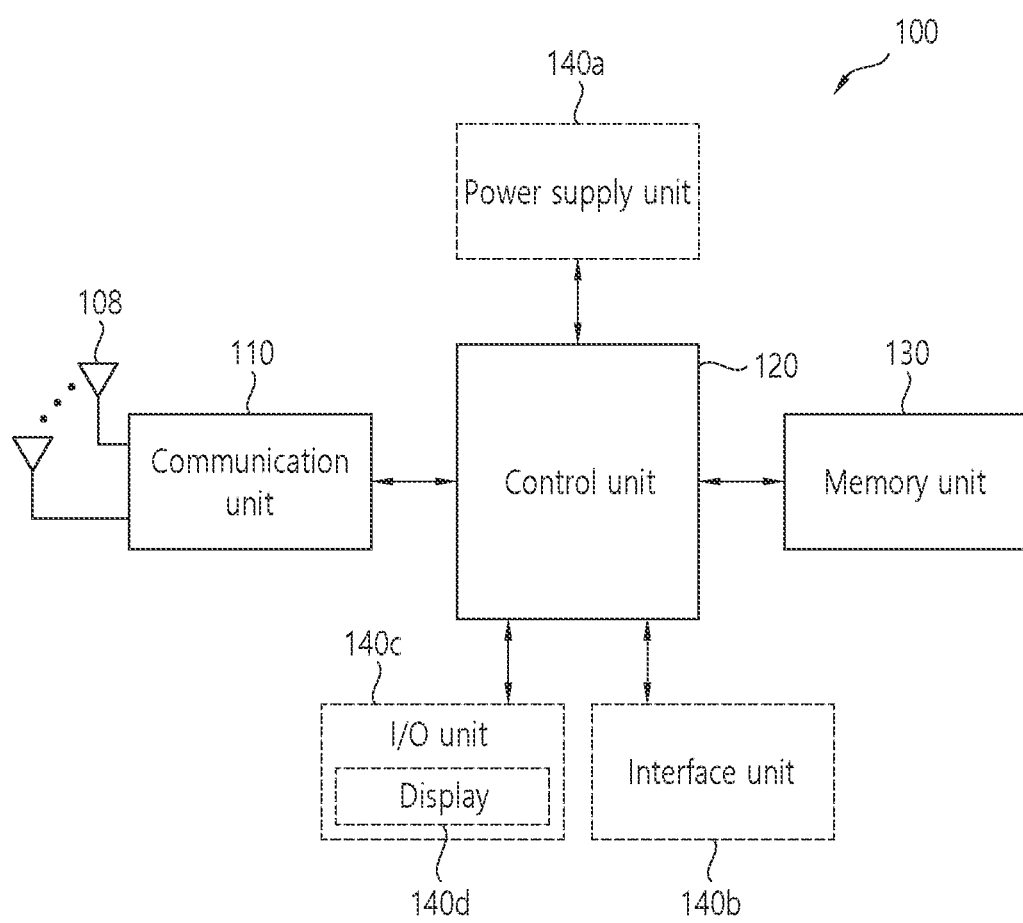
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
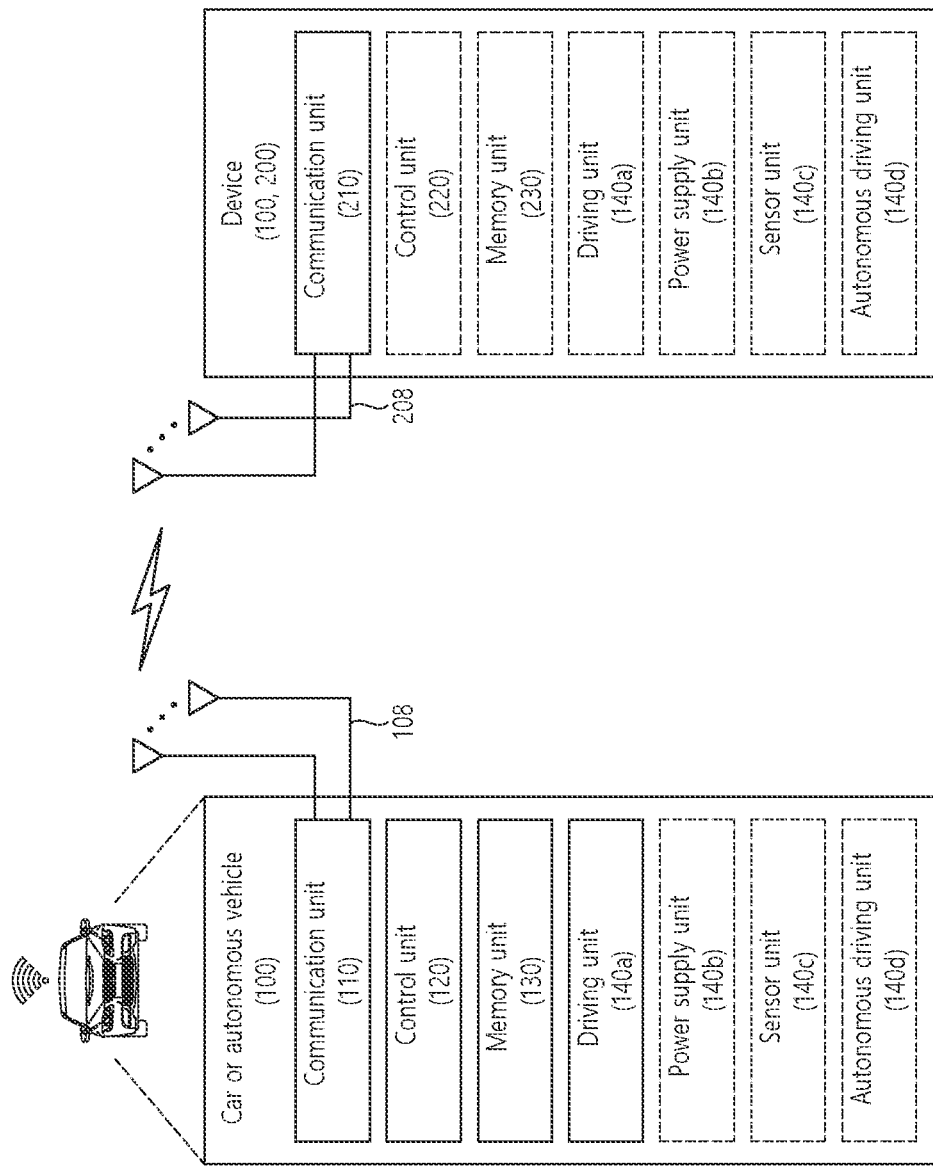
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
    determining a first physical sidelink shared channel (PSSCH) resource, a second PSSCH resource and a third PSSCH resource; and
    transmitting, to a second device, a sidelink control information (SCI) including information related to frequency domains of the second PSSCH resource and the third PSSCH resource, based on a first physical sidelink control channel (PSCCH) resource related to the first PSSCH resource,
    wherein the information related to frequency domains is obtained based on a number of subchannels included in a resource pool, an index of a starting subchannel of the second PSSCH resource, an index of a starting subchannel of the third PSSCH resource, and a number of subchannels allocated for each of PSSCH resources,
    wherein the information related to frequency domains is a zero or a positive integer,
    wherein the information related to frequency domains increases based on an increase in the index of the starting subchannel of the second PSSCH resource or the index of the starting subchannel of the third PSSCH resource, and
    wherein the information related to frequency domains increases based on an increase in the number of sub channels allocated for each of the PSSCH resources.

2. The method of claim 1, wherein the information related to frequency domains represents a combination of the index of the starting subchannel of the second PSSCH resource, the index of the starting subchannel of the third PSSCH resource, and the number of subchannels allocated for each of the PSSCH resources.

3. The method of claim 1, wherein, based on each of the PSSCH resources including N subchannels, the information related to frequency domains increases in an ascending order of the index of the starting subchannel of the second PSSCH resource, and then increases in an ascending order of the index of the starting subchannel of the third PSSCH resource,
    wherein, based on the index of the starting subchannel reaching a maximum value, N increases to N+1,
    wherein, based on each of the PSSCH resources including N+1 subchannels, the information related to frequency domains increases in an ascending order of the index of the starting subchannel of the second PSSCH resource, and then increases in an ascending order of the index of the starting subchannel of the third PSSCH resource, and
    wherein N is a positive integer.

4. The method of claim 1, wherein the first PSSCH resource is a resource located in a time domain before the second PSSCH resource and the third PSSCH resource,
    wherein the PSSCH resources includes the first PSSCH resource, the second PSSCH resource and the third PSSCH resource, and
    wherein each of the PSSCH resources includes the same number of subchannels.

5. The method of claim 1, wherein the first PSSCH resource is a resource located in a time domain after the second PSSCH resource or the third PSSCH resource, wherein the PSSCH resources includes the first PSSCH resource, the second PSSCH resource and the third PSSCH resource, and
    wherein each of the PSSCH resources includes the same number of subchannels.

6. The method of claim 1, wherein the first PSSCH resource, the second PSSCH resource, and the third PSSCH resource are determined based on sensing.

7. The method of claim 1, further comprising:
    receiving, from a base station, information related to the first PSSCH resource, the second PSSCH resource, and the third PSSCH resource,
    wherein the first PSSCH resource, the second PSSCH resource and the third PSSCH resource are determined based on the information.

8. The method of claim 1, wherein the SCI includes information related to time domains of the second PSSCH resource and the third PSSCH resource, and
    wherein the information related to time domains is a zero or a positive integer.

9. The method of claim 8, wherein the information related to time domains is obtained based on a number of slots between the first PSSCH resource and the second PSSCH resource, a number of slots between the first PSSCH resource and the third PSSCH resource, and a number of slots included in a window, and
    wherein the first PSSCH resource is a resource located in a time domain before the second PSSCH resource and the third PSSCH resource.

10. The method of claim 8, wherein the information related to time domains is obtained based on a number of slots between the second PSSCH resource and the first PSSCH resource, a number of slots between the second PSSCH resource and the third PSSCH resource, and a number of slots included in a window, and
    wherein the second PSSCH resource is a resource located in a time domain before the first PSSCH resource and the third PSSCH resource.

11. A method for performing, by a first device, wireless communication, the method comprising:
    determining a first physical sidelink shared channel (PSSCH) resource and a second PSSCH resource; and
    transmitting, to a second device, a sidelink control information (SCI) including information related to a frequency domain of the second PSSCH resource, based on a first physical sidelink control channel (PSCCH) resource related to the first PSSCH resource,
    wherein the information related to the frequency domain of the second PSSCH resource is obtained based on a number of subchannels included in a resource pool, an index of a starting subchannel of the second PSSCH resource, and a number of subchannels allocated for the second PSSCH resource,
    wherein the information related to the frequency domain of the second PSSCH resource is obtained based on following equations,
    the information related to the frequency domain=$S_2$, if m=1
    the information related to the frequency domain=

$$\sum_{n=1}^{m-1} (M+1-n) + S_2, \text{ if } m>1$$

wherein, m is the number of subchannels allocated for the second PSSCH resource, M is the number of subchannels included in the resource pool, and $S_2$ is the index of the starting subchannel of the second PSSCH resource.

12. The method of claim 11, wherein the information related to the frequency domain of the second PSSCH resource represents a combination of the index of the starting subchannel of the second PSSCH resource and the number of subchannels allocated for the second PSSCH resource.

13. A first device configured to perform wireless communication, the first device comprising:
one or more memories storing instructions;
one or more transceivers; and
one or more processors connected to the one or more memories and the one or more transceivers, wherein the one or more processors execute the instructions to:
determine a first physical sidelink shared channel (PSSCH) resource, a second PSSCH resource and a third PSSCH resource; and
transmit, to a second device, a sidelink control information (SCI) including information related to frequency domains of the second PSSCH resource and the third PSSCH resource, based on a first physical sidelink control channel (PSCCH) resource related to the first PSSCH resource,
wherein the information related to frequency domains is obtained based on a number of subchannels included in a resource pool, an index of a starting subchannel of the second PSSCH resource, an index of a starting subchannel of the third PSSCH resource, and a number of subchannels allocated for each of PSSCH resources,
wherein the information related to frequency domains is a zero or a positive integer,
wherein the information related to frequency domains increases based on an increase in the index of the starting subchannel of the second PSSCH resource or the index of the starting subchannel of the third PSSCH resource, and
wherein the information related to frequency domains increases based on an increase in the number of sub channels allocated for each of the PSSCH resources.

14. The first device of claim 13, wherein the information related to frequency domains represents a combination of the index of the starting subchannel of the second PSSCH resource, the index of the starting subchannel of the third PSSCH resource, and the number of subchannels allocated for each of the PSSCH resources.

15. The first device of claim 13, wherein, based on each of the PSSCH resources including N subchannels, the information related to frequency domains increases in an ascending order of the index of the starting subchannel of the second PSSCH resource, and then increases in an ascending order of the index of the starting subchannel of the third PSSCH resource,
wherein, based on the index of the starting subchannel reaching a maximum value, N increases to N+1,
wherein, based on each of the PSSCH resources including N+1 subchannels, the information related to frequency domains increases in an ascending order of the index of the starting subchannel of the second PSSCH resource, and then increases in an ascending order of the index of the starting subchannel of the third PSSCH resource, and
wherein N is a positive integer.

16. The first device of claim 13, wherein the first PSSCH resource is a resource located in a time domain before the second PSSCH resource and the third PSSCH resource,
wherein the PSSCH resources includes the first PSSCH resource, the second PSSCH resource and the third PSSCH resource, and
wherein each of the PSSCH resources includes the same number of subchannels.

17. The first device of claim 13, wherein the SCI includes information related to time domains of the second PSSCH resource and the third PSSCH resource,
wherein the information related to time domains is a zero or a positive integer,
wherein the information related to time domains is obtained based on a number of slots between the first PSSCH resource and the second PSSCH resource, a number of slots between the first PSSCH resource and the third PSSCH resource, and a number of slots included in a window, and
wherein the first PSSCH resource is a resource located in a time domain before the second PSSCH resource and the third PSSCH resource.

* * * * *